US012568320B2

(12) United States Patent
Kim et al.

(10) Patent No.: US 12,568,320 B2
(45) Date of Patent: Mar. 3, 2026

(54) REDUCING AUTO-EXPOSURE LATENCY

(71) Applicant: Waymo LLC, Mountain View, CA (US)

(72) Inventors: Erik Daniel Kim, Sunnyvale, CA (US); Nirav Shailesh kumar Dharia, Milpitas, CA (US)

(73) Assignee: Waymo LLC, Mountain View, CA (US)

( * ) Notice: Subject to any disclaimer, the term of this patent is extended or adjusted under 35 U.S.C. 154(b) by 231 days.

(21) Appl. No.: 18/312,369

(22) Filed: May 4, 2023

(65) Prior Publication Data

US 2024/0373142 A1     Nov. 7, 2024

(51) Int. Cl.
H04N 5/335        (2011.01)
H04N 25/50        (2023.01)

(52) U.S. Cl.
CPC .................................. H04N 25/50 (2023.01)

(58) Field of Classification Search
CPC ...................................................... H04N 25/50
See application file for complete search history.

(56) References Cited

U.S. PATENT DOCUMENTS

| | | |
|---|---|---|
| 8,040,415 B2 | 10/2011 | Urisaka |
| 8,558,944 B2 | 10/2013 | Makii |
| 11,482,159 B2 | 10/2022 | Nagao et al. |

| | | | | |
|---|---|---|---|---|
| 2005/0185075 A1* | 8/2005 | Neter | ................... | H04N 23/843 |
| | | | | 348/E3.02 |
| 2008/0309792 A1* | 12/2008 | Takagi | ................... | H04N 23/74 |
| | | | | 348/229.1 |
| 2009/0147086 A1* | 6/2009 | Uchida | ................... | H04N 23/72 |
| | | | | 348/E17.002 |

(Continued)

FOREIGN PATENT DOCUMENTS

| | | |
|---|---|---|
| CN | 110708475 A | 8/2021 |
| CN | 115297269 A | 11/2022 |

(Continued)

OTHER PUBLICATIONS

Emmanuel Onzon, Fahim Mannan, and Felix Heide, "Neural Auto-Exposure for High-Dynamic Range Object Detection", The Computer Vision Foundation, Nov. 2, 2021, pp. 7710-7720.

(Continued)

*Primary Examiner* — Gary C Vieaux
(74) *Attorney, Agent, or Firm* — McDonnell Boehnen Hulbert & Berghoff LLP

(57)        ABSTRACT

Example embodiments relate to reducing auto-exposure latency. An example embodiment includes a method of reducing auto-exposure latency. The method includes determining, by a processor, a first setting of an exposure parameter for a first frame to be captured by an image sensor. The first setting of the exposure parameter is determined based at least in part on characteristics of a previous frame captured by the image sensor. The first setting of the exposure parameter is determined during a first frame period associated with capturing the first frame. The method also includes initiating, by the processor, a first frame exposure operation based on the first setting of the exposure parameter. During the first frame exposure operation, the image sensor captures the first frame during the first frame period.

21 Claims, 17 Drawing Sheets

(56) References Cited

U.S. PATENT DOCUMENTS

| | | | |
|---|---|---|---|
| 2010/0214429 A1* | 8/2010 | Usui | H04N 23/611 |
| | | | 348/222.1 |
| 2013/0008964 A1 | 1/2013 | Hawyley et al. | |
| 2014/0078341 A1 | 3/2014 | Havens et al. | |
| 2015/0156388 A1 | 6/2015 | Neglur | |
| 2018/0152662 A1* | 5/2018 | Takahashi | H04N 9/8042 |
| 2018/0278823 A1 | 9/2018 | Horesh | |
| 2018/0295309 A1 | 10/2018 | Kuriyama et al. | |
| 2018/0359410 A1 | 12/2018 | Ain-Kedem et al. | |
| 2020/0068121 A1 | 2/2020 | Wang | |
| 2021/0109585 A1 | 4/2021 | Fleming et al. | |
| 2022/0006940 A1 | 1/2022 | Gao et al. | |
| 2022/0261951 A1 | 8/2022 | Renschler et al. | |
| 2022/0392250 A1 | 12/2022 | Qing et al. | |

FOREIGN PATENT DOCUMENTS

| | | | |
|---|---|---|---|
| JP | 2008022485 A | 1/2008 | |
| KR | 2020047389 A | 5/2020 | |
| WO | 2023015992 A1 | 2/2023 | |

OTHER PUBLICATIONS

Yang Ni, "QLog Solar-Cell Mode Photodiode logarithmic CMOS Pixel Using Charge Compression and Readout", Sensors, Feb. 14, 2018, pp. 1-12.

* cited by examiner

800

802

DETERMINE, BY A PROCESSOR, A FIRST SETTING OF AN EXPOSURE PARAMETER FOR A FIRST FRAME TO BE CAPTURED BY AN IMAGE SENSOR, THE FIRST SETTING OF THE EXPOSURE PARAMETER DETERMINED BASED AT LEAST IN PART ON CHARACTERISTICS OF A PREVIOUS FRAME CAPTURED BY THE IMAGE SENSOR, AND THE FIRST SETTING OF THE EXPOSURE PARAMETER DETERMINED DURING A FIRST FRAME PERIOD ASSOCIATED WITH CAPTURING THE FIRST FRAME

804

INITIATE, BY THE PROCESSOR, A FIRST FRAME EXPOSURE OPERATION DURING THE FIRST FRAME PERIOD, THE FIRST FRAME EXPOSURE OPERATION BASED ON THE FIRST SETTING OF THE EXPOSURE PARAMETER

FIG. 8

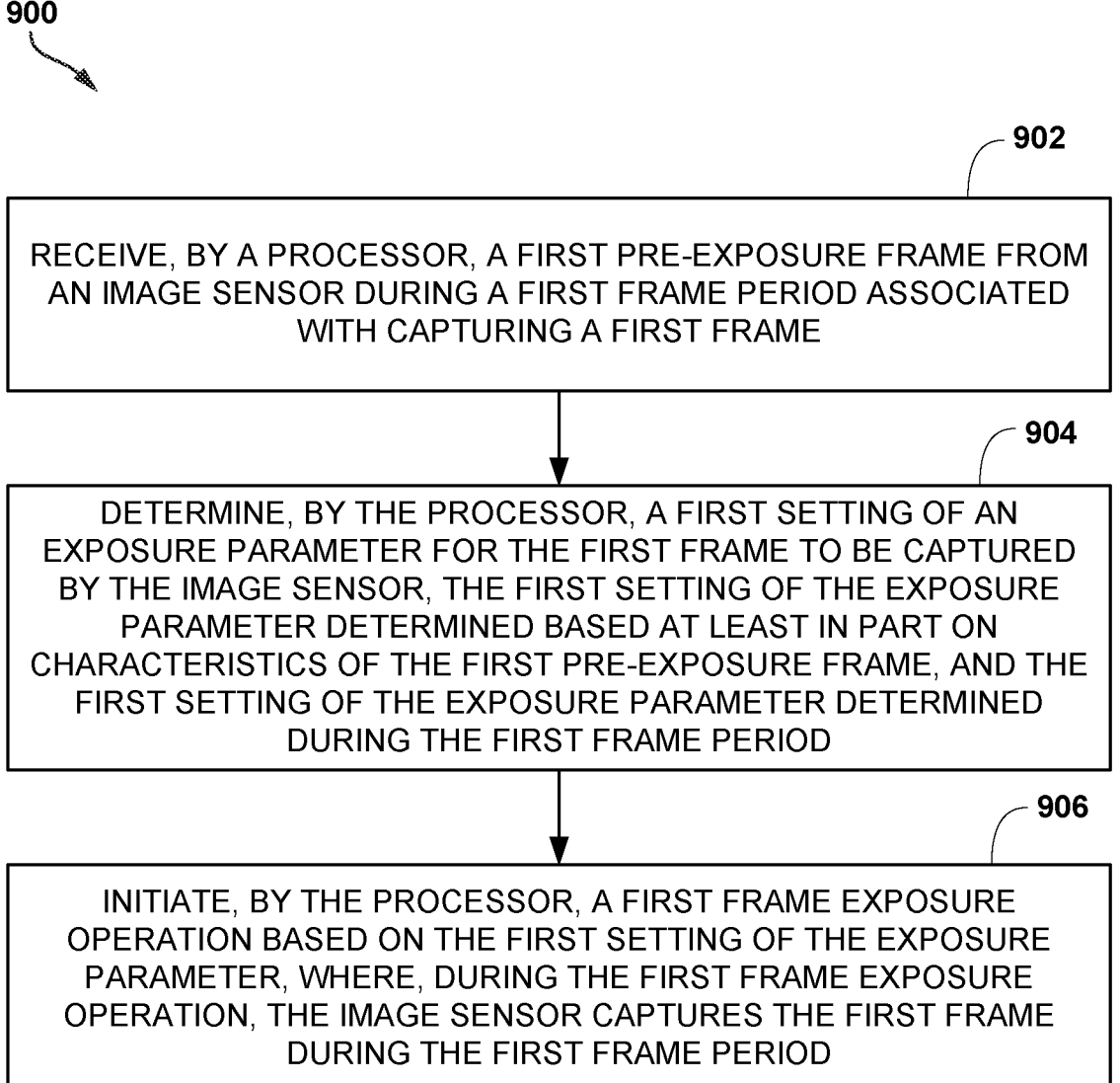

900

902

RECEIVE, BY A PROCESSOR, A FIRST PRE-EXPOSURE FRAME FROM AN IMAGE SENSOR DURING A FIRST FRAME PERIOD ASSOCIATED WITH CAPTURING A FIRST FRAME

904

DETERMINE, BY THE PROCESSOR, A FIRST SETTING OF AN EXPOSURE PARAMETER FOR THE FIRST FRAME TO BE CAPTURED BY THE IMAGE SENSOR, THE FIRST SETTING OF THE EXPOSURE PARAMETER DETERMINED BASED AT LEAST IN PART ON CHARACTERISTICS OF THE FIRST PRE-EXPOSURE FRAME, AND THE FIRST SETTING OF THE EXPOSURE PARAMETER DETERMINED DURING THE FIRST FRAME PERIOD

906

INITIATE, BY THE PROCESSOR, A FIRST FRAME EXPOSURE OPERATION BASED ON THE FIRST SETTING OF THE EXPOSURE PARAMETER, WHERE, DURING THE FIRST FRAME EXPOSURE OPERATION, THE IMAGE SENSOR CAPTURES THE FIRST FRAME DURING THE FIRST FRAME PERIOD

REDUCING AUTO-EXPOSURE LATENCY

BACKGROUND

Unless otherwise indicated herein, the description in this section is not prior art to the claims in this application and is not admitted to be prior art by inclusion in this section.

An autonomous vehicle can include one or more image sensors that capture images of a surrounding environment. Image sensors typically have different exposure settings that are selectively used to improve the quality of images. As a non-limiting example, if the surrounding environment is relatively dark, an exposure time used to capture an image at the image sensor can be adjusted to have a relatively long duration, which in turn may increase lighting characteristics of the image (e.g., brighten the image). However, if the surrounding environment is relatively bright, the exposure time used to capture the image at the image sensor can be adjusted to have a relatively short duration, which in turn may decrease lighting characteristics of the image (e.g., darken the image). Typically, there is a delay between when an exposure setting is adjusted and when the image sensor captures an image with the adjusted exposure setting. For example, image sensors can have a single-frame delay or a multiple-frame delay between when an exposure setting is changed and when a frame acquired with the new setting is read. As a result, during the frame delay(s), image sensors can capture one or more over-exposed frames and/or under-exposed frames, which take up storage space and provide little (or no) benefit to the operation of an autonomous vehicle.

SUMMARY

The techniques described herein reduce latency (e.g., frame delays) associated with an auto-exposure operation. In particular, the techniques described herein enable a target exposure parameter, such as exposure time, analog gain, or digital gain, to be determined and implemented in a single frame period. For example, according to one embodiment, during a particular frame period, an on-chip processor can analyze a previous frame captured by an image sensor to determine a target exposure parameter for a "current" frame to be captured by an image sensor during the particular frame period. As another example, according to one embodiment, during the particular frame period, the on-chip processor can sample a subset of pixels on the image sensor to generate a "pre-exposure" frame and analyze the pre-exposure frame to determine a target exposure parameter. In response to determining the target exposure parameter (e.g., based on the previous frame or based on the pre-exposure frame), the image sensor can capture the current frame using the target exposure parameter such that there is no frame delay between determining the target exposure parameter and reading out an image frame that is captured using the target exposure parameter.

A system includes an image sensor and a processor coupled to the image sensor. The processor is configured to determine a first setting of an exposure parameter for a first frame to be captured by the image sensor. The first setting of the exposure parameter is determined based at least in part on characteristics of a previous frame captured by the image sensor. The first setting of the exposure parameter is determined during a first frame period associated with capturing the first frame. The image sensor is configured to perform a first frame exposure operation during the first frame period.

2

The first frame exposure operation is based on the first setting of the exposure parameter.

A method includes determining, by a processor, a first setting of an exposure parameter for a first frame to be captured by an image sensor. The first setting of the exposure parameter is determined based at least in part on characteristics of a previous frame captured by the image sensor. The first setting of the exposure parameter is determined during a first frame period associated with capturing the first frame. The method also includes initiating, by the processor, a first frame exposure operation based on the first setting of the exposure parameter. During the first frame exposure operation, the image sensor captures the first frame during the first frame period.

A non-transitory computer-readable medium includes instructions that, when executed by a processor, cause the processor to perform operations. The operations include determining a first setting of an exposure parameter for a first frame to be captured by an image sensor. The first setting of the exposure parameter is determined based at least in part on characteristics of a previous frame captured by the image sensor. The first setting of the exposure parameter is determined during a first frame period associated with capturing the first frame. The operations also include initiating a first frame exposure operation based on the first setting of the exposure parameter. During the first frame exposure operation, the image sensor captures the first frame during the first frame period.

A system includes an image sensor and a processor coupled to the image sensor. The processor is configured to receive a first pre-exposure frame from the image sensor during a first frame period associated with capturing a first frame. The processor is also configured to determine a first setting of an exposure parameter for the first frame to be captured by the image sensor. The first setting of the exposure parameter is determined based at least in part on characteristics of the first pre-exposure frame, and the first setting of the exposure parameter is determined during the first frame period. The image sensor is configured to perform a first frame exposure operation based on the first setting of the exposure parameter. During the first frame exposure operation, the image sensor captures the first frame during the first frame period.

A method includes receiving, by a processor, a first pre-exposure frame from an image sensor during a first frame period associated with capturing a first frame. The method also includes determining, by the processor, a first setting of an exposure parameter for the first frame to be captured by the image sensor. The first setting of the exposure parameter is determined based at least in part on characteristics of the first pre-exposure frame, and the first setting of the exposure parameter is determined during the first frame period. The method further includes initiating, by the processor, a first frame exposure operation based on the first setting of the exposure parameter. During the first frame exposure operation, the image sensor captures the first frame during the first frame period.

A non-transitory computer-readable medium includes instructions that, when executed by a processor, cause the processor to perform operations. The operations include receiving a first pre-exposure frame from an image sensor during a first frame period associated with capturing a first frame. The operations also include determining a first setting of an exposure parameter for the first frame to be captured by the image sensor. The first setting of the exposure parameter is determined based at least in part on characteristics of the first pre-exposure frame, and the first setting of the exposure parameter is determined during the first frame period. The operations further include initiating a first frame exposure operation based on the first setting of the exposure parameter. During the first frame exposure operation, the image sensor captures the first frame during the first frame period.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 8 is a method for reducing auto-exposure latency, according to example embodiments.

FIG. 9 is another method for reducing auto-exposure latency, according to example embodiments.

DETAILED DESCRIPTION

Figure 1:
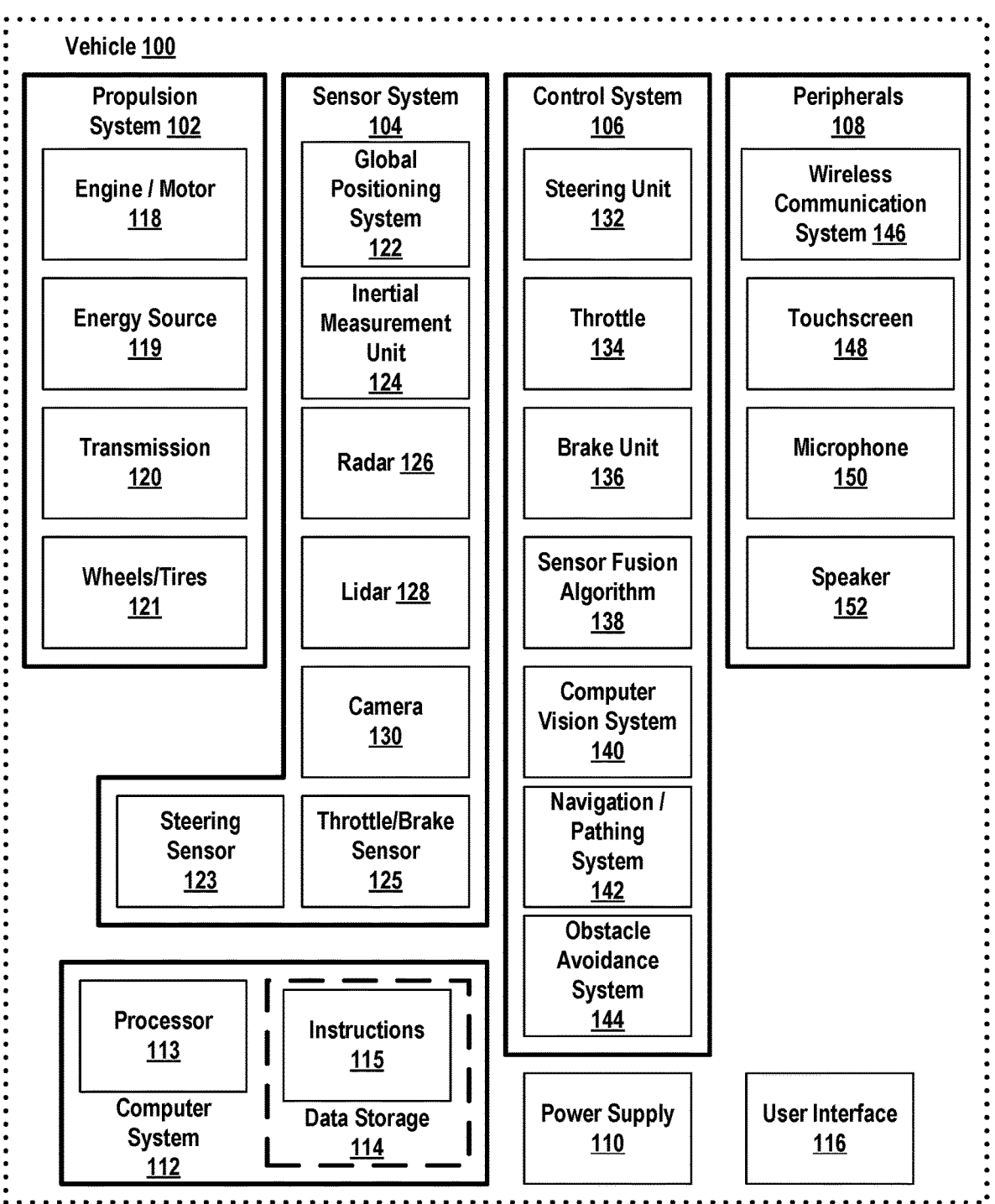
FIG. 1 is a functional block diagram illustrating a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

The techniques described herein reduce latency associated with an auto-exposure operation. In particular, the techniques described herein enable an exposure parameter for a frame, such as an exposure time, to be determined and implemented (e.g., adjusted) during a frame period associated with capturing the frame. As a result, instead of having a delay (e.g., a single frame delay or a multiple frame delay) between when a target exposure parameter is determined and when a frame captured using the target exposure parameter is read from an image sensor, the techniques described herein can reduce (or eliminate) the delay such that a frame with the target exposure parameter is read during the same frame period that the target exposure parameter is determined. By reducing the latency described above, the techniques described herein can reduce the number of over-exposed frames that are captured and can reduce the number of under-exposed frames that are captured.

As used herein, a "frame period" for a current frame corresponds to a time period that begins directly after the capture of a previous frame and ends directly after the capture of the current frame. Thus, when a shutter closes to complete the capture of the previous frame, the frame period for the previous frame ends and the frame period for the current frame begins. Additionally, when the shutter closes to complete the capture of the current frame, the frame period for the current frame ends. The length of time that defines the frame period can be defined as the inverse of the frame rate, where the frame rate is inherent to an associated camera system.

To reduce the latency as described above, according to some implementations, during a frame period for a "current frame" (e.g., a frame period associated with capturing the current frame), a processor can dynamically change an exposure parameter used to capture the current frame based on characteristics of a previously captured frame. To illustrate, during the frame period for the current frame, the processor can analyze the previous frame that was captured and determine a setting for the exposure parameter based on the analysis. As a non-limiting example, if a lighting metric in the previous frame failed to satisfy a lower lighting threshold (e.g., the previous frame was too dark), during the frame period for the current frame, the processor can determine that an exposure time for the current frame should be extended and implement the extended exposure time at the image sensor. Conversely, if the lighting metric in the previous frame failed to satisfy an upper lighting threshold (e.g., the previous frame was too bright), during the frame period for the current frame, the processor can determine that the exposure time for the current frame should be reduced and implement the reduced exposure time at the image sensor. It should be appreciated that, in addition to analyzing the previous frame to determine the exposure parameter for the current frame, the processor can also analyze other data, such as one or more additional frames that were previously captured, a histogram of data associated with previously captured frames, external inputs indicative of data collected from other sensors, etc. After the exposure parameter is determined, the image sensor can perform a frame exposure operation using the exposure parameter to capture the current frame during the frame period for the current frame.

According to other implementations, to reduce the latency as described above, during a frame period for a current frame, a processor can dynamically change an exposure parameter used to capture the current frame based on characteristics of a "pre-exposure" frame. In this implementation, at the beginning of the frame period for the current frame, the processor can sample a subset of image pixels on an image sensor (for a short period of time) to generate the pre-exposure frame. The subset of image pixels can correspond to a specific region of interest or can correspond to distributed areas across the image sensor. The pre-exposure frame can be used by the processor to determine how, or whether, the exposure parameter should be adjusted in capturing the current frame. After determining how the exposure parameter should be adjusted, during the frame period for the current frame, the image sensor can perform a frame exposure operation using the adjusted exposure parameter to capture the current frame.

Although the exposure parameter can be adjusted based on the pre-exposure frame, in some implementations, the exposure parameter can additionally be adjusted based on data from one or more other sensors. As a non-limiting example, at the beginning of the frame period for the current frame, the processor can also receive data (e.g., images) from one or more other sensors. In these implementations, the processor can adjust the exposure parameter for the current frame based on the pre-exposure frame and based on the data (e.g., images) from the one or more other sensors.

The following description and accompanying drawings will elucidate features of various example embodiments. The embodiments provided are by way of example, and are not intended to be limiting. As such, the dimensions of the drawings are not necessarily to scale.

Particular embodiments are described herein with reference to the drawings. In the description, common features are designated by common reference numbers throughout the drawings. In some figures, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 4, multiple frames are illustrated and associated with reference numbers 450A, 450B, etc. When referring to a particular one of these frames, such as the frame 450A, the distinguishing letter "A" is used. However, when referring to any arbitrary one of these frames or to these frames as a group, the reference number 450 is used without a distinguishing letter.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, and tractor trailers), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, and robot devices. Other vehicles are possible as well. Further, in some embodiments, example systems might not include a vehicle.

Referring now to the figures, FIG. 1 is a functional block diagram illustrating an example vehicle 100, which may be configured to operate fully or partially in an autonomous mode. More specifically, the vehicle 100 may operate in an autonomous mode without human interaction through receiving control instructions from a computing system. As part of operating in the autonomous mode, the vehicle 100 may use sensors to detect and possibly identify objects of the surrounding environment to enable safe navigation. Additionally, the example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, the vehicle 100 may also include subsystems that enable the driver to control operations of the vehicle 100 such as steering, acceleration, and braking, while the computing system performs assistive functions such as lane-departure warnings/lane-keeping assist or adaptive cruise control based on other objects (e.g., vehicles) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's 100 surroundings and supervise the assisted driving operations. Here, even though the vehicle 100 may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, the vehicle 100 may include various subsystems, such as a propulsion system 102, a sensor system 104, a control system 106, one or more peripherals 108, a power supply 110, a computer system 112 (which could also be referred to as a computing system) with data storage 114, and a user interface 116. In other examples, the vehicle 100 may include more or fewer subsystems, which can each include multiple elements. The subsystems and components of the vehicle 100 may be interconnected in various ways. In addition, functions of the vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

The propulsion system 102 may include one or more components operable to provide powered motion for the vehicle 100 and can include an engine/motor 118, an energy source 119, a transmission 120, and wheels/tires 121, among other possible components. For example, the engine/motor 118 may be configured to convert the energy source 119 into mechanical energy and can correspond to one or a combination of an internal combustion engine, an electric motor, steam engine, or Stirling engine, among other possible options. For instance, in some embodiments, the propulsion system 102 may include multiple types of engines and/or motors, such as a gasoline engine and an electric motor.

The energy source 119 represents a source of energy that may, in full or in part, power one or more systems of the vehicle 100 (e.g., the engine/motor 118). For instance, the energy source 119 can correspond to gasoline, diesel, other petroleum-based fuels, propane, other compressed gas-based fuels, ethanol, solar panels, batteries, and/or other sources of electrical power. In some embodiments, the energy source 119 may include a combination of fuel tanks, batteries, capacitors, and/or flywheels.

The transmission 120 may transmit mechanical power from the engine/motor 118 to the wheels/tires 121 and/or other possible systems of the vehicle 100. As such, the transmission 120 may include a gearbox, a clutch, a differential, and a drive shaft, among other possible components. A drive shaft may include axles that connect to one or more of the wheels/tires 121.

The wheels/tires 121 of the vehicle 100 may have various configurations within example embodiments. For instance, the vehicle 100 may exist in a unicycle, bicycle/motorcycle, tricycle, or car/truck four-wheel format, among other possible configurations. As such, the wheels/tires 121 may connect to the vehicle 100 in various ways and can exist in different materials, such as metal and rubber.

The sensor system 104 can include various types of sensors, such as a Global Positioning System (GPS) 122, an inertial measurement unit (IMU) 124, a radar 126, a lidar 128, a camera 130, a steering sensor 123, and a throttle/brake sensor 125, among other possible sensors. In some embodiments, the sensor system 104 may also include sensors configured to monitor internal systems of the vehicle 100 (e.g., $O_2$ monitor, fuel gauge, engine oil temperature, and brake wear).

The GPS 122 may include a transceiver operable to provide information regarding the position of the vehicle 100 with respect to the Earth. The IMU 124 may have a configuration that uses one or more accelerometers and/or gyroscopes and may sense position and orientation changes of the vehicle 100 based on inertial acceleration. For example, the IMU 124 may detect a pitch and yaw of the vehicle 100 while the vehicle 100 is stationary or in motion.

The radar 126 may represent one or more systems configured to use radio signals to sense objects, including the speed and heading of the objects, within the surrounding environment of the vehicle 100. As such, the radar 126 may include antennas configured to transmit and receive radio signals. In some embodiments, the radar 126 may correspond to a mountable radar configured to obtain measurements of the surrounding environment of the vehicle 100.

The lidar 128 may include one or more laser sources, a laser scanner, and one or more detectors, among other system components, and may operate in a coherent mode (e.g., using heterodyne detection) or in an incoherent detection mode (i.e., time-of-flight mode). In some embodiments, the one or more detectors of the lidar 128 may include one or more photodetectors, which may be especially sensitive detectors (e.g., avalanche photodiodes). In some examples, such photodetectors may be capable of detecting single photons (e.g., single-photon avalanche diodes (SPADs)). Further, such photodetectors can be arranged (e.g., through an electrical connection in series) into an array (e.g., as in a silicon photomultiplier (SiPM)). In some examples, the one or more photodetectors are Geiger-mode operated devices and the lidar includes subcomponents designed for such Geiger-mode operation.

The camera 130 may include one or more devices (e.g., still camera, video camera, a thermal imaging camera, a stereo camera, and a night vision camera) configured to capture images of the surrounding environment of the vehicle 100.

The steering sensor 123 may sense a steering angle of the vehicle 100, which may involve measuring an angle of the steering wheel or measuring an electrical signal representative of the angle of the steering wheel. In some embodiments, the steering sensor 123 may measure an angle of the wheels of the vehicle 100, such as detecting an angle of the wheels with respect to a forward axis of the vehicle 100. The steering sensor 123 may also be configured to measure a combination (or a subset) of the angle of the steering wheel, electrical signal representing the angle of the steering wheel, and the angle of the wheels of the vehicle 100.

The throttle/brake sensor 125 may detect the position of either the throttle position or brake position of the vehicle 100. For instance, the throttle/brake sensor 125 may measure the angle of both the gas pedal (throttle) and brake pedal or may measure an electrical signal that could represent, for instance, an angle of a gas pedal (throttle) and/or an angle of a brake pedal. The throttle/brake sensor 125 may also measure an angle of a throttle body of the vehicle 100, which may include part of the physical mechanism that provides modulation of the energy source 119 to the engine/motor 118 (e.g., a butterfly valve and a carburetor). Additionally, the throttle/brake sensor 125 may measure a pressure of one or more brake pads on a rotor of the vehicle 100 or a combination (or a subset) of the angle of the gas pedal (throttle) and brake pedal, an electrical signal representing the angle of the gas pedal (throttle) and brake pedal, the angle of the throttle body, and the pressure that at least one brake pad is applying to a rotor of the vehicle 100. In other embodiments, the throttle/brake sensor 125 may be configured to measure a pressure applied to a pedal of the vehicle, such as a throttle or brake pedal.

The control system 106 may include components configured to assist in navigating the vehicle 100, such as a steering unit 132, a throttle 134, a brake unit 136, a sensor fusion algorithm 138, a computer vision system 140, a navigation/pathing system 142, and an obstacle avoidance system 144. More specifically, the steering unit 132 may be operable to adjust the heading of the vehicle 100, and the throttle 134 may control the operating speed of the engine/motor 118 to control the acceleration of the vehicle 100. The brake unit 136 may decelerate the vehicle 100, which may involve using friction to decelerate the wheels/tires 121. In some embodiments, the brake unit 136 may convert kinetic energy of the wheels/tires 121 to electric current for subsequent use by a system or systems of the vehicle 100.

The sensor fusion algorithm 138 may include a Kalman filter, Bayesian network, or other algorithms that can process data from the sensor system 104. In some embodiments, the sensor fusion algorithm 138 may provide assessments based on incoming sensor data, such as evaluations of individual objects and/or features, evaluations of a particular situation, and/or evaluations of potential impacts within a given situation.

The computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, or one or more machine-learned models) operable to process and analyze images in an effort to determine objects that are in motion (e.g., other vehicles, pedestrians, bicyclists, or animals) and objects that are not in motion (e.g., traffic lights, roadway boundaries, speedbumps, or potholes). As such, the computer vision system 140 may use object recognition, Structure From Motion (SFM), video tracking, and other algorithms used in computer vision, for instance, to recognize objects, map an environment, track objects, estimate the speed of objects, etc. The navigation/pathing system 142 may determine a driving path for the vehicle 100, which may involve dynamically adjusting navigation during operation. As such, the navigation/pathing system 142 may use data from the sensor fusion algorithm 138, the GPS 122, and maps, among other sources to navigate the vehicle 100. The obstacle avoidance system 144 may evaluate potential obstacles based on sensor data and cause systems of the vehicle 100 to avoid or otherwise negotiate the potential obstacles.

As shown in FIG. 1, the vehicle 100 may also include peripherals 108, such as a wireless communication system 146, a touchscreen 148, an interior microphone 150, and/or a speaker 152. The peripherals 108 may provide controls or other elements for a user to interact with a user interface 116. For example, the touchscreen 148 may provide information to users of the vehicle 100. The user interface 116 may also accept input from the user via the touchscreen 148. The peripherals 108 may also enable the vehicle 100 to communicate with devices, such as other vehicle devices.

The wireless communication system 146 may wirelessly communicate with one or more devices directly or via a communication network. For example, the wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. The wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

The vehicle 100 may include the power supply 110 for powering components. The power supply 110 may include a rechargeable lithium-ion or lead-acid battery in some embodiments. For instance, the power supply 110 may include one or more batteries configured to provide electrical power. The vehicle 100 may also use other types of power supplies. In an example embodiment, the power supply 110 and the energy source 119 may be integrated into a single energy source.

The vehicle 100 may also include the computer system 112 to perform operations, such as operations described therein. As such, the computer system 112 may include at least one processor 113 (which could include at least one microprocessor) operable to execute instructions 115 stored in a non-transitory, computer-readable medium, such as the data storage 114. In some embodiments, the computer system 112 may represent a plurality of computing devices that may serve to control individual components or subsystems of vehicle 100 in a distributed fashion.

In some embodiments, the data storage 114 may contain instructions 115 (e.g., program logic) executable by the processor 113 to execute various functions of the vehicle 100, including those described above in connection with FIG. 1. The data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by the vehicle 100 and the computer system 112 during the operation of the vehicle 100 in the autonomous, semi-autonomous, and/or manual modes.

The vehicle 100 may include the user interface 116 for providing information to or receiving input from a user of the vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., the propulsion system 102, the sensor system 104, or the control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from the sensor system 104.

The components of the vehicle 100 could be configured to work in an interconnected fashion with other components within or outside their respective systems. For instance, in an example embodiment, the camera 130 could capture a plurality of images that could represent information about a state of a surrounding environment of the vehicle 100 operating in an autonomous or semi-autonomous mode. The state of the surrounding environment could include parameters of the road on which the vehicle is operating. For example, the computer vision system 140 may be able to recognize the slope (grade) or other features based on the plurality of images of a roadway. Additionally, the combination of the GPS 122 and the features recognized by the computer vision system 140 may be used with map data stored in the data storage 114 to determine specific road parameters. Further, the radar 126 and/or the lidar 128, and/or some other environmental mapping, ranging, and/or positioning sensor system may also provide information about the surroundings of the vehicle.

In other words, a combination of various sensors (which could be termed input-indication and output-indication sensors) and the computer system 112 could interact to provide an indication of an input provided to control a vehicle or an indication of the surroundings of a vehicle.

In some embodiments, the computer system 112 may make a determination about various objects based on data that is provided by systems other than the radio system. For example, the vehicle 100 may have lasers or other optical sensors configured to sense objects in a field of view of the vehicle. The computer system 112 may use the outputs from the various sensors to determine information about objects in a field of view of the vehicle, and may determine distance and direction information to the various objects. The computer system 112 may also determine whether objects are desirable or undesirable based on the outputs from the various sensors.

Although FIG. 1 shows various components of the vehicle 100 (i.e., the wireless communication system 146, the computer system 112, the data storage 114, and the user interface 116) as being integrated into the vehicle 100, one or more of these components could be mounted or associated separately from the vehicle 100. For example, the data storage 114 could, in part or in full, exist separate from the vehicle 100. Thus, the vehicle 100 could be provided in the form of device elements that may be located separately or together. The device elements that make up the vehicle 100 could be communicatively coupled together in a wired and/or wireless fashion.

FIGS. 2A-2E show an example vehicle 200 (e.g., a fully autonomous vehicle or semi-autonomous vehicle) that can include some or all of the functions described in connection with the vehicle 100 in reference to FIG. 1. Although the vehicle 200 is illustrated in FIGS. 2A-2E as a van with side view mirrors for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices).

The example vehicle 200 may include one or more sensor systems 202, 204, 206, 208, 210, 212, 214, and 218. In some embodiments, the sensor systems 202, 204, 206, 208, 210, 212, 214, and/or 218 could represent one or more optical systems (e.g. cameras), one or more lidars, one or more radars, one or more inertial sensors, one or more humidity sensors, one or more acoustic sensors (e.g., microphones and sonar devices), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar could be utilized in self-driving or other types of navigation, planning, perception, and/or mapping operations of the vehicle 200. In addition, the sensor systems 202, 204, 206, 208, 210, 212, 214, and/or 218 could represent a combination of sensors described herein (e.g., one or more lidars and radars; one or more lidars and cameras; one or more cameras and radars; or one or more lidars, cameras, and radars).

Note that the number, location, and type of sensor systems (e.g., 202 and 204) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, or to adapt to specialized environmental or application circumstances). For example, the sensor systems (e.g., 202 and 204) could be disposed in various other locations on the vehicle (e.g., at location 216) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, the sensor system 202 can include any combination of cameras, radars, lidars, inertial sensors, humidity sensors, and acoustic sensors (e.g., microphones and sonar devices). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more of the sensor systems 202, 204, 206, 208, 210, 212, 214, and/or 218 could include one or more lidar devices. For example, the lidar devices could include a plurality of light-emitter devices arranged over a range of angles with respect to a given plane (e.g., the x-y plane). For example, one or more of the sensor systems 202, 204, 206, 208, 210, 212, 214, and/or 218 may be configured to rotate or pivot about an axis (e.g., the z-axis) perpendicular to the given plane so as to illuminate an environment surrounding the vehicle 200 with light pulses. Based on detecting various aspects of reflected light pulses (e.g., the elapsed time of flight, polarization, and intensity), information about the surrounding environment may be determined.

In an example embodiment, the sensor systems 202, 204, 206, 208, 210, 212, 214, and/or 218 may be configured to provide respective point cloud information that may relate to physical objects within the surrounding environment of the vehicle 200. While the vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with the vehicle 100 of FIG. 1.

In an example configuration, one or more radars can be located on the vehicle 200. Similar to the radar 126 described above, the one or more radars may include antennas configured to transmit and receive radio waves (e.g., electromagnetic waves having frequencies between 30 Hz and 300 GHz). Such radio waves may be used to determine the distance to and/or velocity of one or more objects in the surrounding environment of the vehicle 200. For example, one or more of the sensor systems 202, 204, 206, 208, 210, 212, 214, and/or 218 could include one or more radars. In some examples, one or more radars can be located near the rear of the vehicle 200 (e.g., the sensor systems 208 and 210), to actively scan the environment near the back of the vehicle 200 for the presence of radio-reflective objects. Similarly, one or more radars can be located near the front of the vehicle 200 (e.g., the sensor systems 212 or 214) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more of the sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors) used to sense a surrounding environment of the vehicle 200. Acoustic sensors may include microphones (e.g., piezoelectric microphones, condenser microphones, ribbon microphones, or microelectromechanical systems (MEMS) microphones) used to sense acoustic waves (i.e., pressure differentials) in a fluid (e.g., air) of the environment surrounding the vehicle 200. Such acoustic sensors may be used to identify sounds in the surrounding environment (e.g., sirens, human speech, animal sounds, or alarms) upon which control strategy for vehicle 200 may be based. For example, if the acoustic sensor detects a siren (e.g., an ambulatory siren or a fire engine siren), the vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 2A:
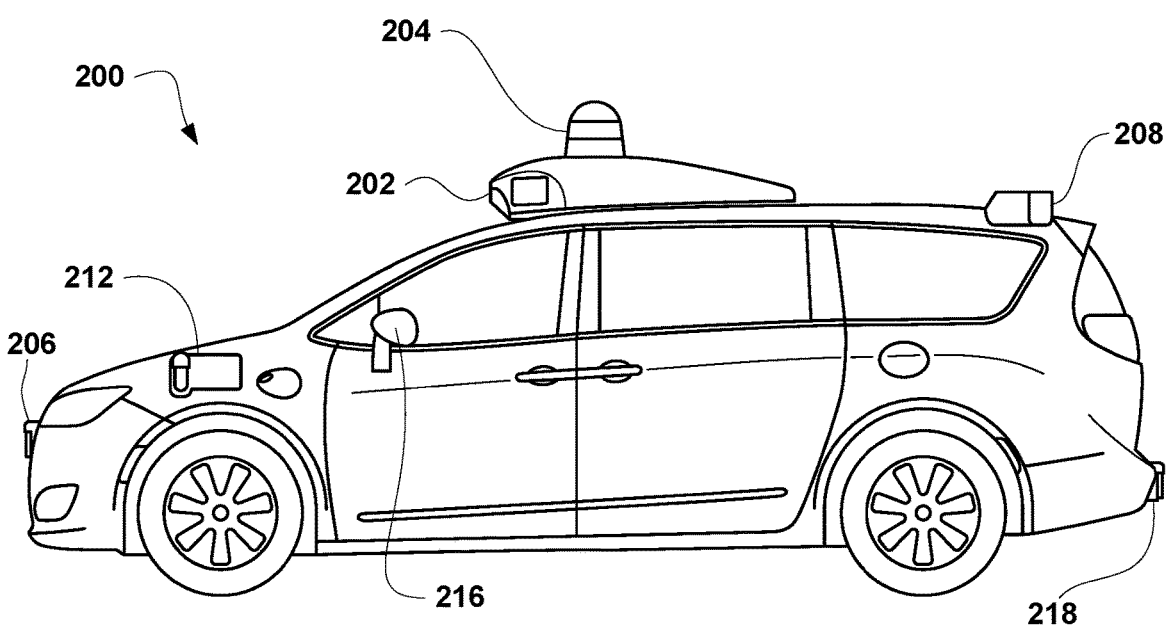
FIG. 2A is an illustration of a physical configuration of a vehicle, according to example embodiments.
Figure 2B:
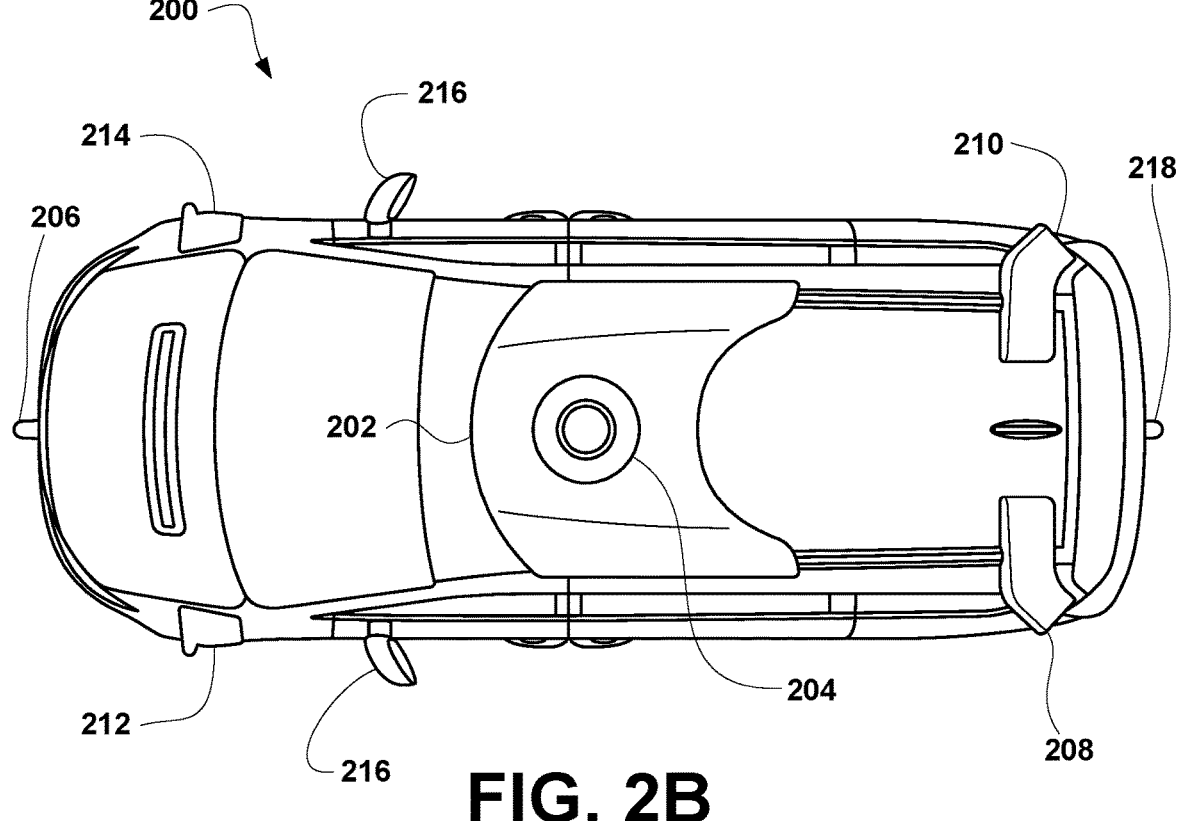
FIG. 2B is an illustration of a physical configuration of a vehicle, according to example embodiments.
Figure 2C:
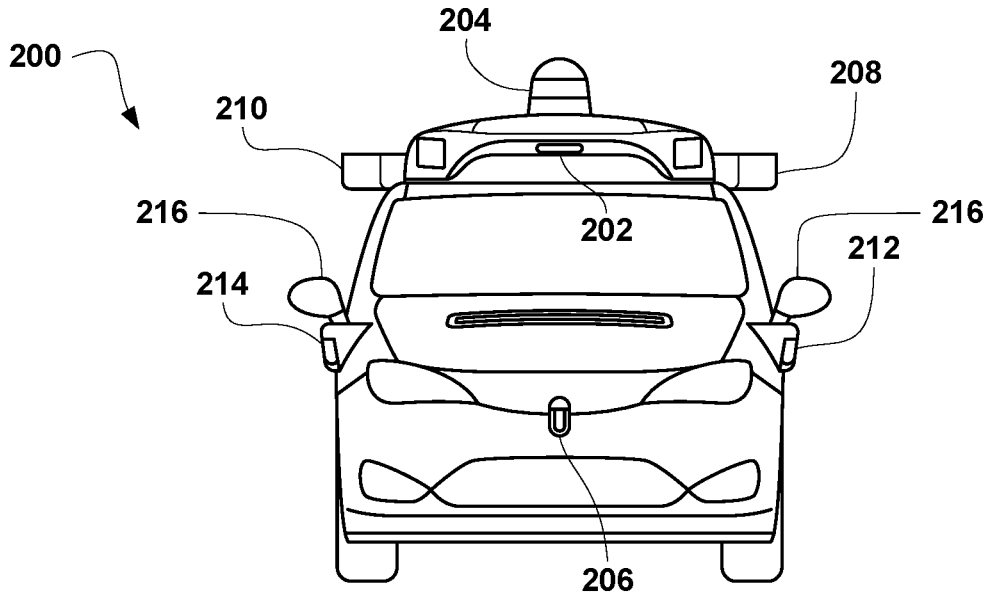
FIG. 2C is an illustration of a physical configuration of a vehicle, according to example embodiments.
Figure 2D:
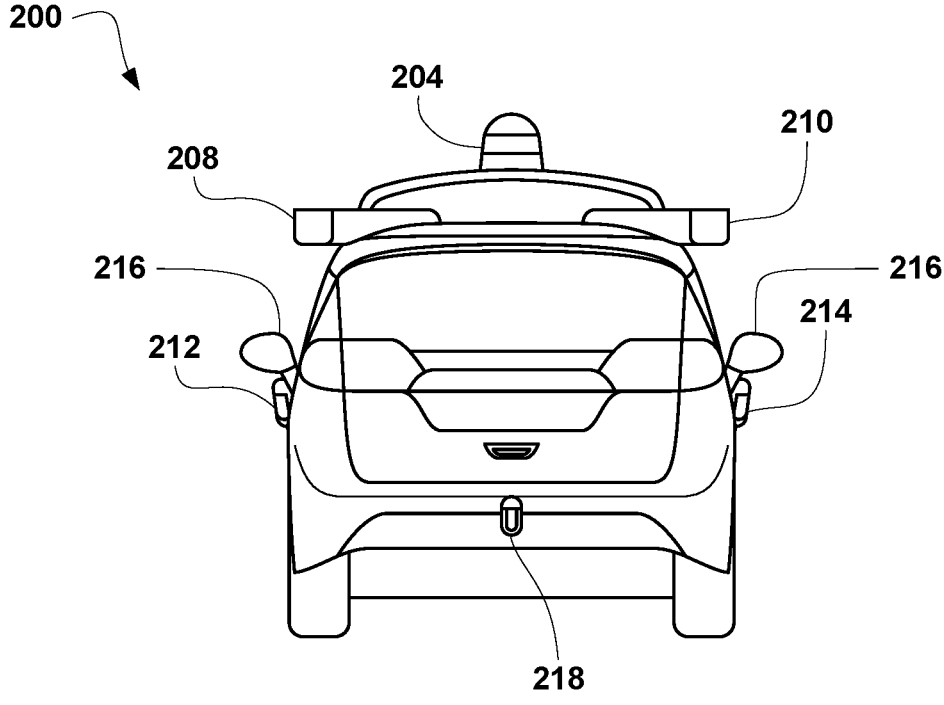
FIG. 2D is an illustration of a physical configuration of a vehicle, according to example embodiments.
Figure 2E:
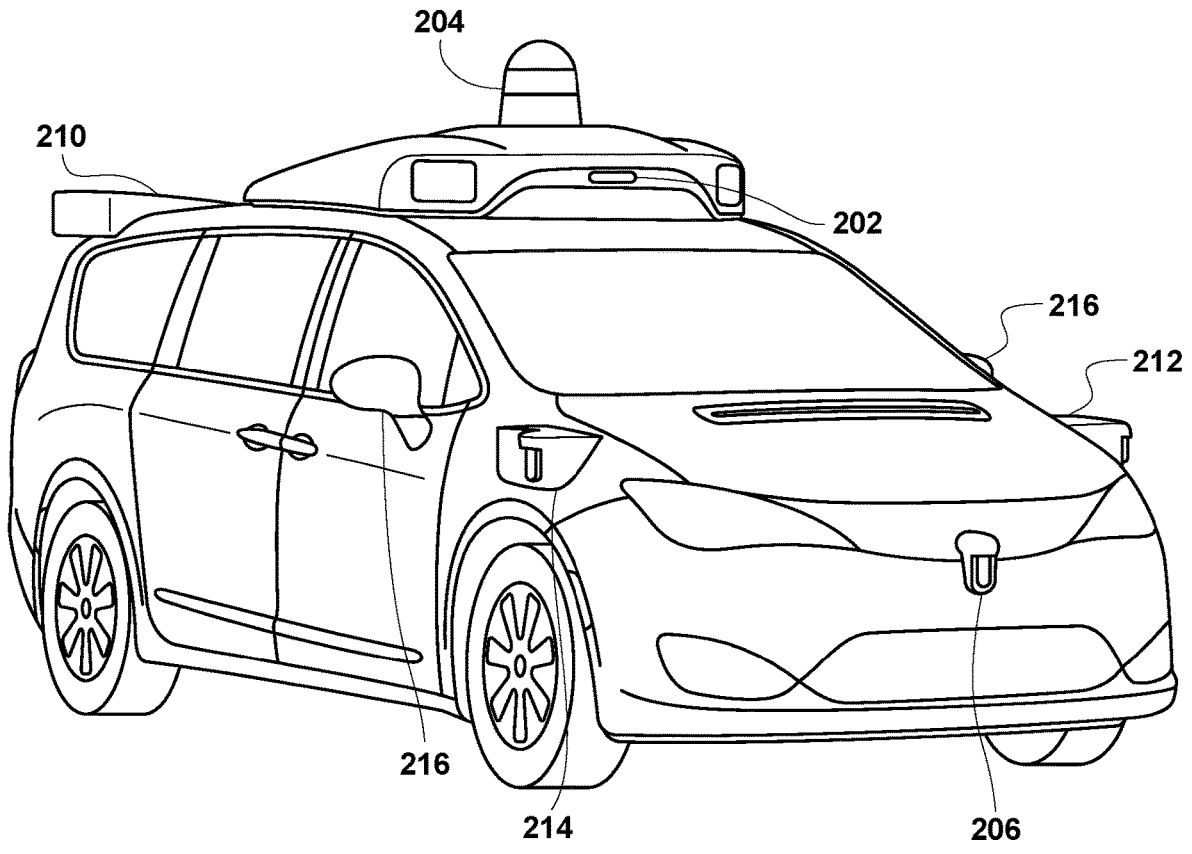
FIG. 2E is an illustration of a physical configuration of a vehicle, according to example embodiments.
Figure 2F:
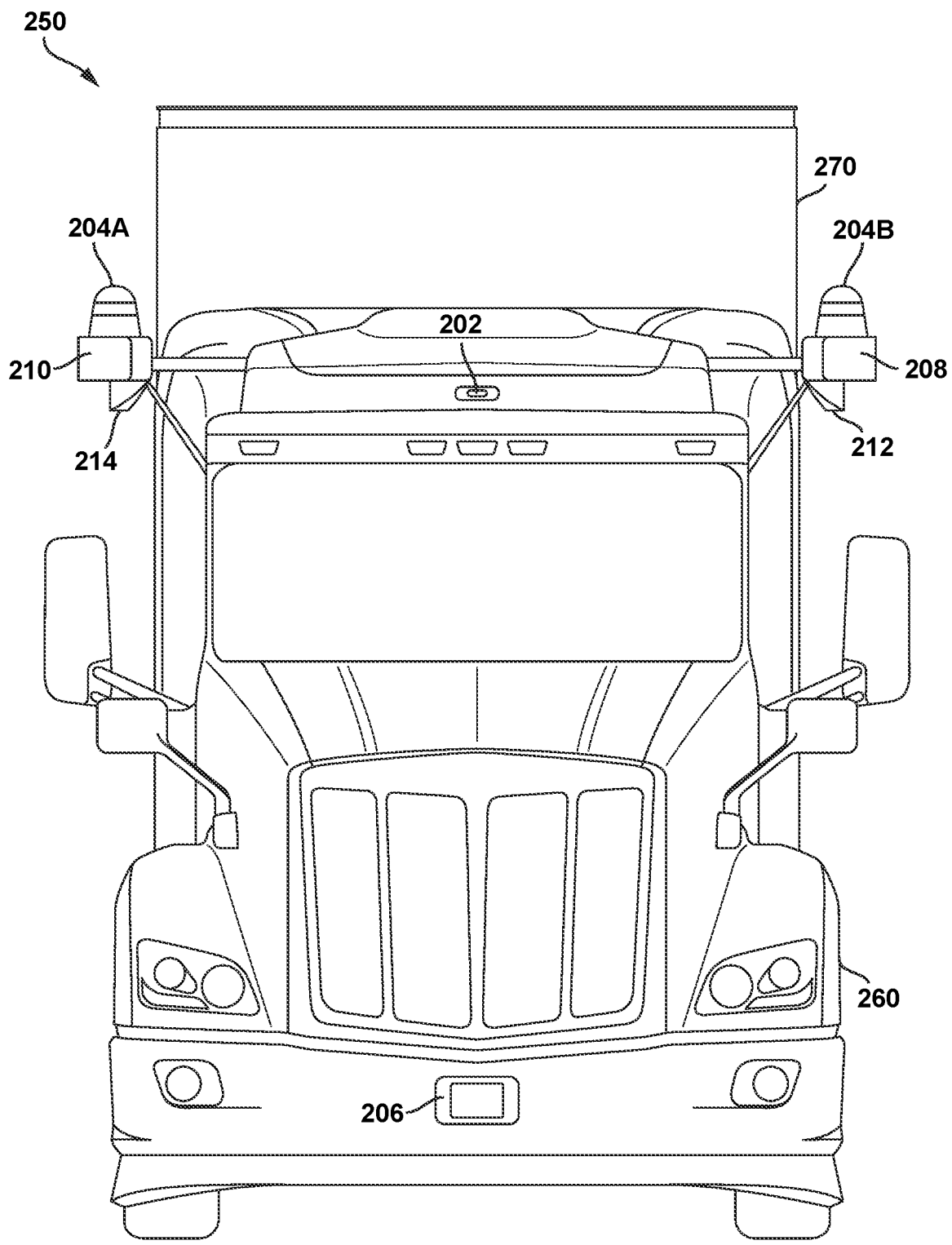
FIG. 2F is an illustration of a physical configuration of a vehicle, according to example embodiments.
Figure 2G:
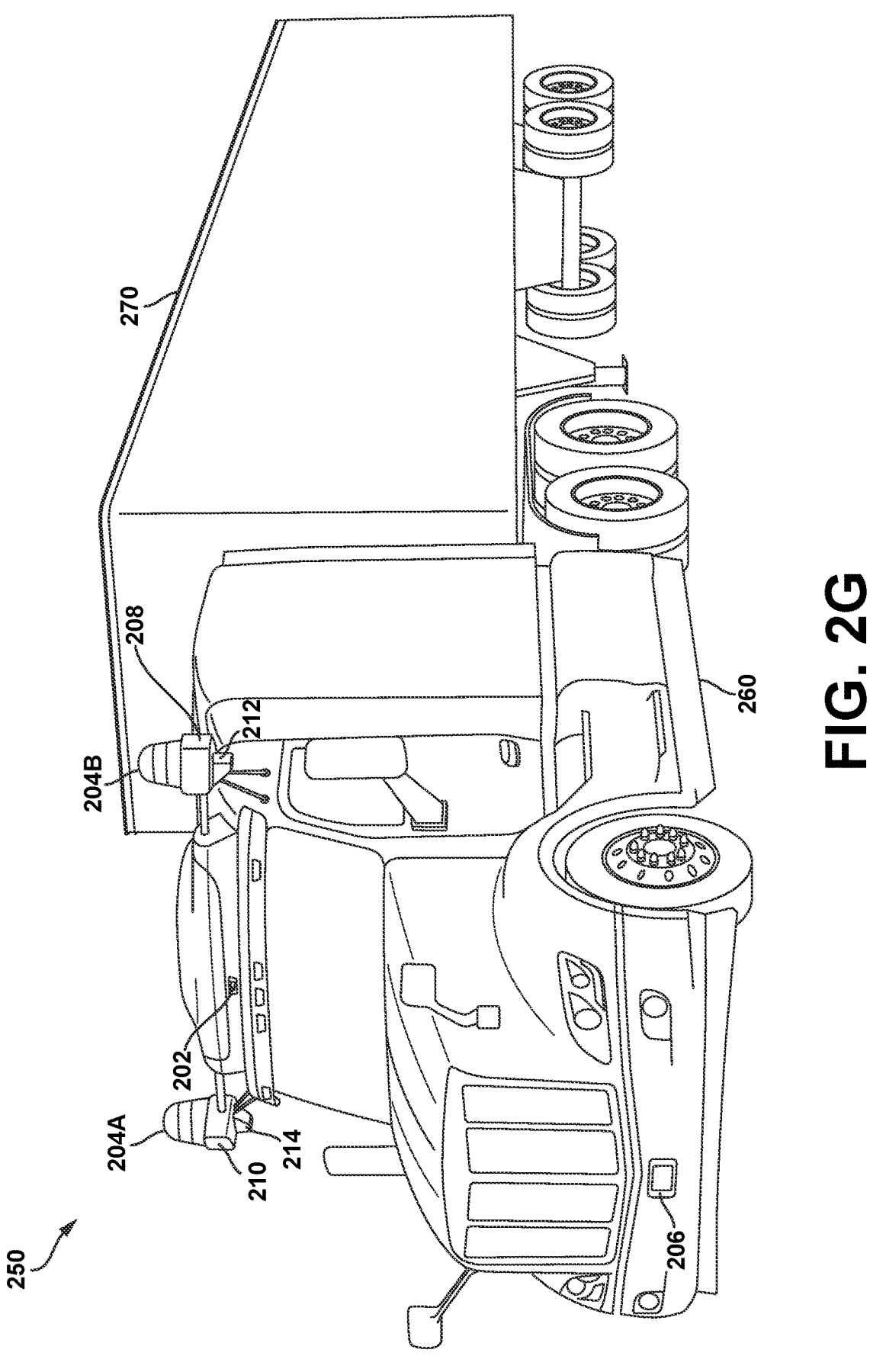
FIG. 2G is an illustration of a physical configuration of a vehicle, according to example embodiments.
Figure 2H:
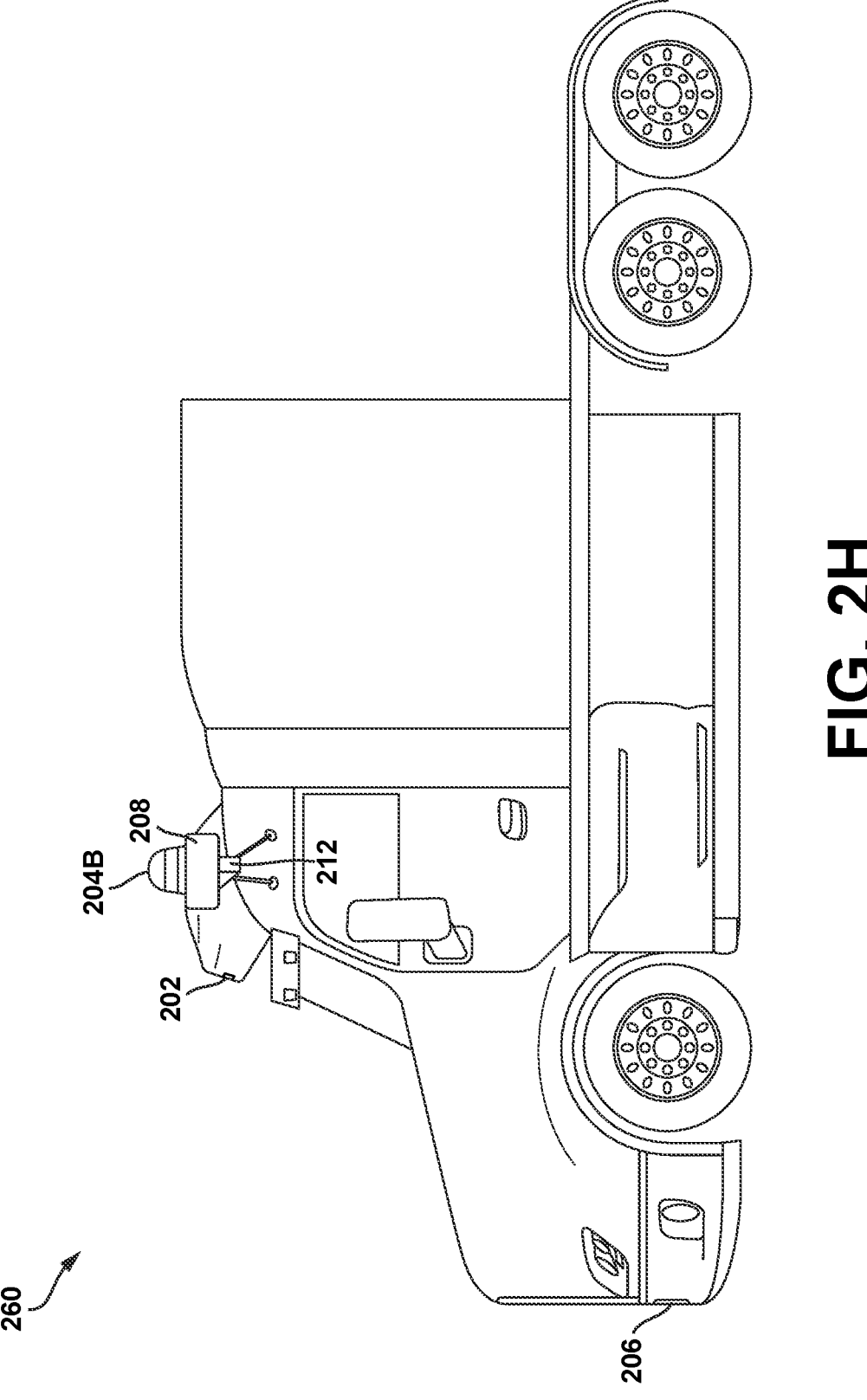
FIG. 2H is an illustration of a physical configuration of a vehicle, according to example embodiments.
Figure 2I:
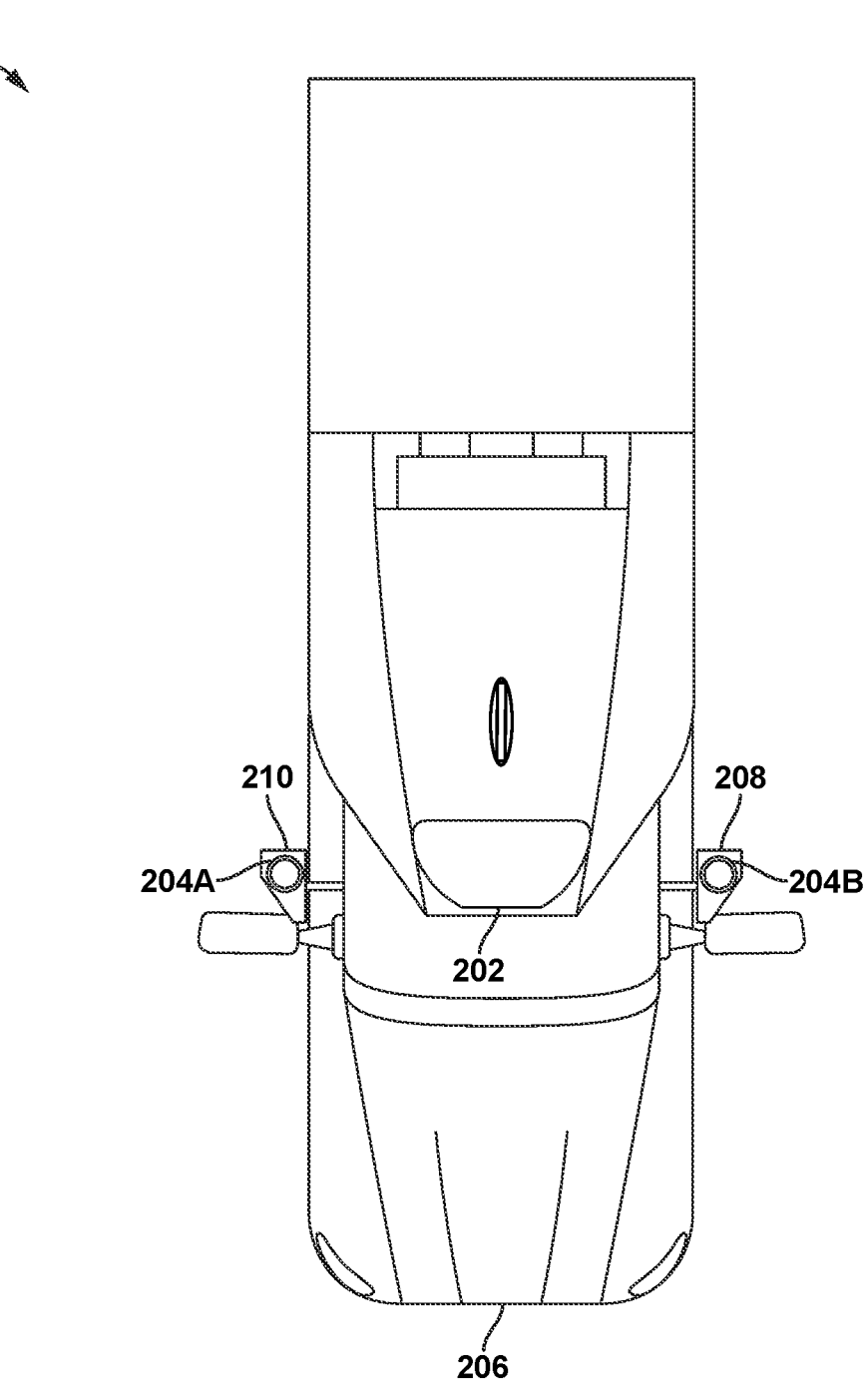
FIG. 2I is an illustration of a physical configuration of a vehicle, according to example embodiments.

As described above, in some embodiments, the vehicle 200 may take the form of a van, but alternate forms are also possible and are contemplated herein. As such, FIGS. 2F-2I illustrate embodiments where a vehicle 250 takes the form of a semi-truck. For example, FIG. 2F illustrates a front-view of the vehicle 250 and FIG. 2G illustrates an isometric view of the vehicle 250. In embodiments where the vehicle 250 is a semi-truck, the vehicle 250 may include a tractor portion 260 and a trailer portion 270 (illustrated in FIG. 2G). FIGS. 2H and 2I provide a side view and a top view, respectively, of the tractor portion 260. Similar to the vehicle 200 illustrated above, the vehicle 250 illustrated in FIGS. 2F-2I may also include a variety of sensor systems (e.g., similar to the sensor systems 202, 206, 208, 210, 212, 214 shown and described with reference to FIGS. 2A-2E). In some embodiments, whereas the vehicle 200 of FIGS. 2A-2E may only include a single copy of some sensor systems (e.g., the sensor system 204), the vehicle 250 illustrated in FIGS. 2F-2I may include multiple copies of that sensor system (e.g., the sensor systems 204A and 204B, as illustrated).

While drawings and description throughout may reference a given form of a vehicle (e.g., the semi-truck vehicle 250 or the van vehicle 200), it is understood that embodiments described herein can be equally applied in a variety of vehicle contexts (e.g., with modifications employed to account for a form factor of vehicle). For example, sensors and/or other components described or illustrated as being part of the van vehicle 200 could also be used (e.g., for navigation and/or obstacle detection and avoidance) in the semi-truck vehicle 250.

Figure 2J:
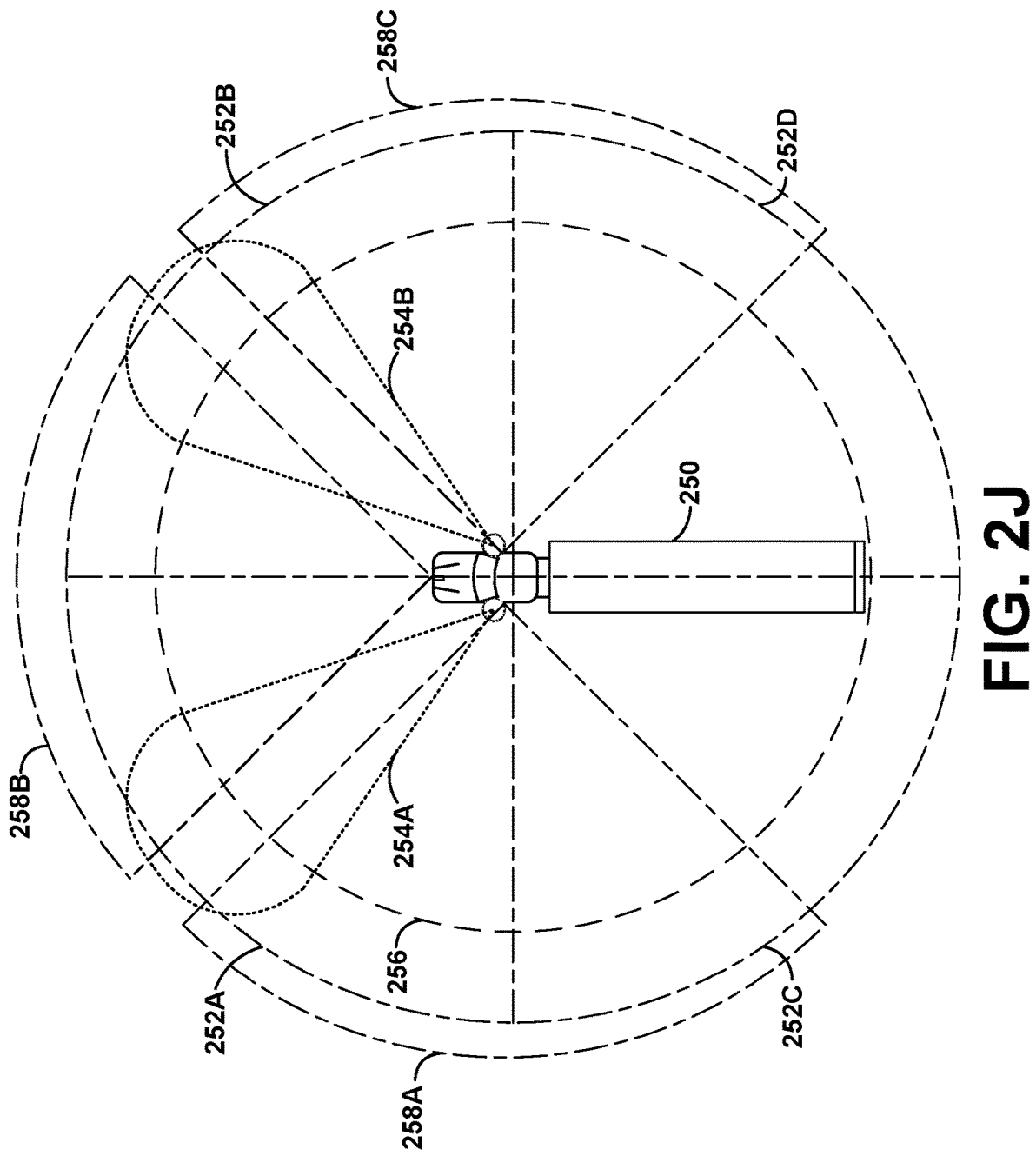
FIG. 2J is an illustration of a field of view for various sensors, according to example embodiments.

FIG. 2J illustrates various sensor fields of view (e.g., associated with the vehicle 250 described above). As described above, the vehicle 250 may contain a plurality of sensors/sensor units. The locations of the various sensors may correspond to the locations of the sensors disclosed in FIGS. 2F-2I, for example. However, in some instances, the sensors may have other locations. Sensors location reference numbers are omitted from FIG. 2J for simplicity of the drawing. For each sensor unit of the vehicle 250, FIG. 2J illustrates a representative field of view (e.g., fields of view labeled as 252A, 252B, 252C, 252D, 254A, 254B, 256, 258A, 258B, and 258C). The field of view of a sensor may include an angular region (e.g., an azimuthal angular region and/or an elevational angular region) over which the sensor may detect objects.

Figure 2K:
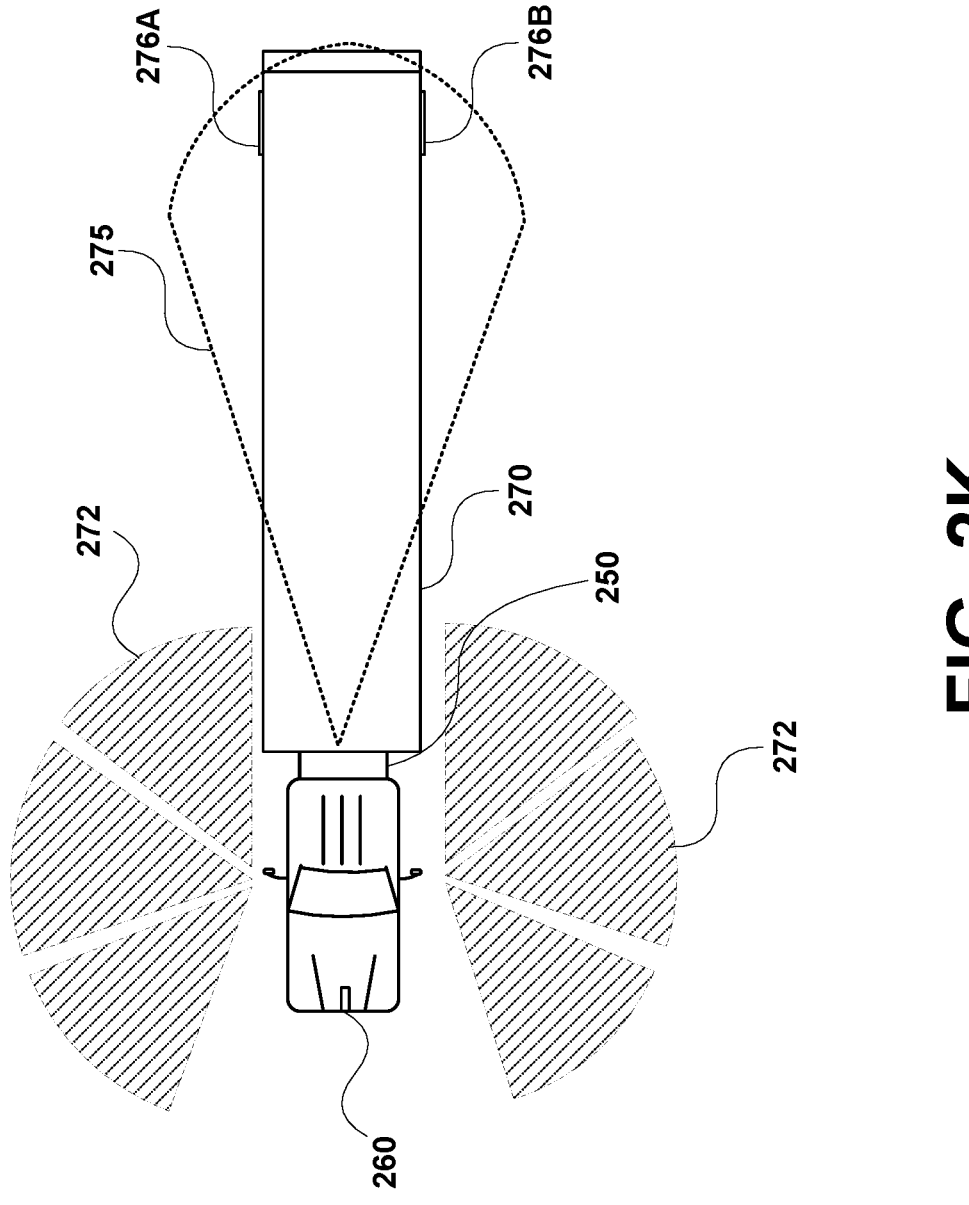
FIG. 2K is an illustration of beam steering for a sensor, according to example embodiments.

FIG. 2K illustrates beam steering for a sensor of a vehicle (e.g., the vehicle 250 shown and described with reference to FIGS. 2F-2J), according to example embodiments. In various embodiments, a sensor unit of the vehicle 250 may be a radar, a lidar, a sonar, etc. Further, in some embodiments, during the operation of the sensor, the sensor may be scanned within the field of view of the sensor. Various different scanning angles for an example sensor are shown as regions 272, which each indicate the angular region over which the sensor is operating. The sensor may periodically or iteratively change the region over which it is operating. In some embodiments, multiple sensors may be used by the vehicle 250 to measure the regions 272. In addition, other regions may be included in other examples. For instance, one or more sensors may measure aspects of the trailer 270 of the vehicle 250 and/or a region directly in front of the vehicle 250.

At some angles, a region of operation 275 of the sensor may include rear wheels 276A, 276B of the trailer 270. Thus, the sensor may measure the rear wheel 276A and/or the rear wheel 276B during operation. For example, the rear wheels 276A, 276B may reflect lidar signals or radar signals transmitted by the sensor. The sensor may receive the reflected signals from the rear wheels 276A, 276. Therefore, the data collected by the sensor may include data from the reflections off the wheel.

In some instances, such as when the sensor is a radar, the reflections from the rear wheels 276A, 276B may appear as noise in the received radar signals. Consequently, the radar may operate with an enhanced signal to noise ratio in instances where the rear wheels 276A, 276B direct radar signals away from the sensor.

Figure 3:
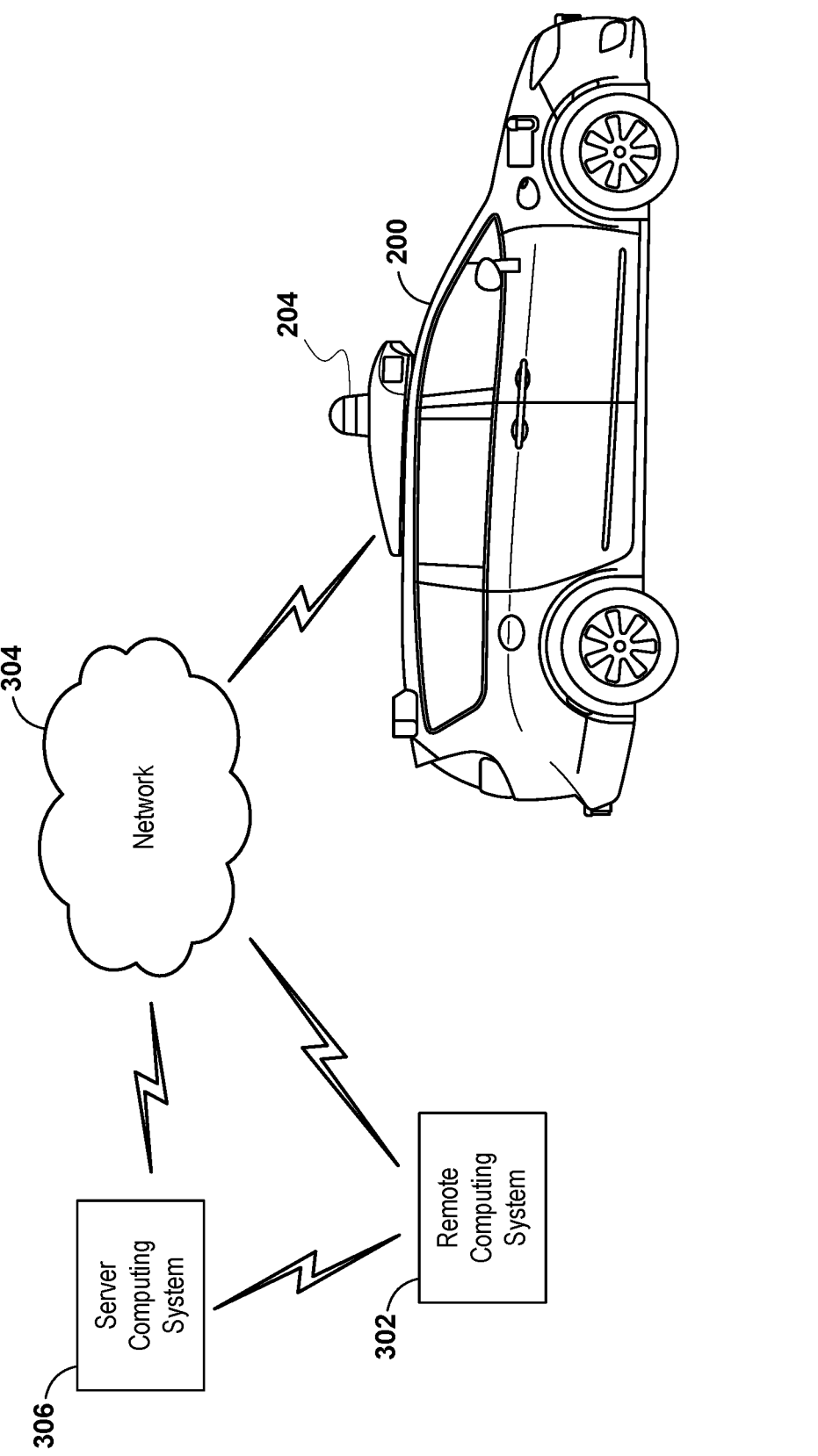
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between a remote computing system 302 and the vehicle 200 via a network 304. Wireless communication may also occur between a server computing system 306 and the remote computing system 302, and between the server computing system 306 and the vehicle 200.

The vehicle 200 can correspond to various types of vehicles capable of transporting passengers or objects between locations, and may take the form of any one or more of the vehicles discussed above. In some instances, the vehicle 200 may operate in an autonomous or semi-autonomous mode that enables a control system to safely navigate the vehicle 200 between destinations using sensor measurements. When operating in an autonomous or semi-autonomous mode, the vehicle 200 may navigate with or without passengers. As a result, the vehicle 200 may pick up and drop off passengers between desired destinations.

The remote computing system 302 may represent any type of device related to remote assistance techniques, including but not limited to those described herein. Within examples, the remote computing system 302 may represent any type of device configured to (i) receive information related to the vehicle 200, (ii) provide an interface through which a human operator can in turn perceive the information and input a response related to the information, and (iii) transmit the response to the vehicle 200 or to other devices. The remote computing system 302 may take various forms, such as a workstation, a desktop computer, a laptop, a tablet, a mobile phone (e.g., a smart phone), and/or a server. In some examples, the remote computing system 302 may include multiple computing devices operating together in a network configuration.

The remote computing system 302 may include one or more subsystems and components similar or identical to the subsystems and components of the vehicle 200. At a minimum, the remote computing system 302 may include a processor configured for performing various operations described herein. In some embodiments, the remote computing system 302 may also include a user interface that includes input/output devices, such as a touchscreen and a speaker. Other examples are possible as well.

The network 304 represents infrastructure that enables wireless communication between the remote computing system 302 and the vehicle 200. The network 304 also enables wireless communication between the server computing system 306 and the remote computing system 302, and between the server computing system 306 and the vehicle 200.

The position of the remote computing system 302 can vary within examples. For instance, the remote computing system 302 may have a remote position from the vehicle 200 that has a wireless communication via the network 304. In another example, the remote computing system 302 may correspond to a computing device within the vehicle 200 that is separate from the vehicle 200, but with which a human operator can interact while a passenger or driver of the vehicle 200. In some examples, the remote computing system 302 may be a computing device with a touchscreen operable by the passenger of the vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

The server computing system 306 may be configured to wirelessly communicate with the remote computing system 302 and the vehicle 200 via the network 304 (or perhaps directly with the remote computing system 302 and/or the vehicle 200). The server computing system 306 may represent any computing device configured to receive, store, determine, and/or send information relating to the vehicle 200 and the remote assistance thereof. As such, the server computing system 306 may be configured to perform any operation(s), or portions of such operation(s), that is/are described herein as performed by the remote computing system 302 and/or the vehicle 200. Some embodiments of wireless communication related to remote assistance may utilize the server computing system 306, while others may not.

The server computing system 306 may include one or more subsystems and components similar or identical to the subsystems and components of the remote computing system 302 and/or the vehicle 200, such as a processor configured for performing various operations described herein, and a wireless communication interface for receiving information from, and providing information to, the remote computing system 302 and the vehicle 200.

The various systems described above may perform various operations. These operations and related features will now be described.

In line with the discussion above, a computing system (e.g., the remote computing system 302, the server computing system 306, or a computing system local to vehicle 200) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., the vehicle 200) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives. In one example, a camera may be configured to capture still images and/or video.

In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4:
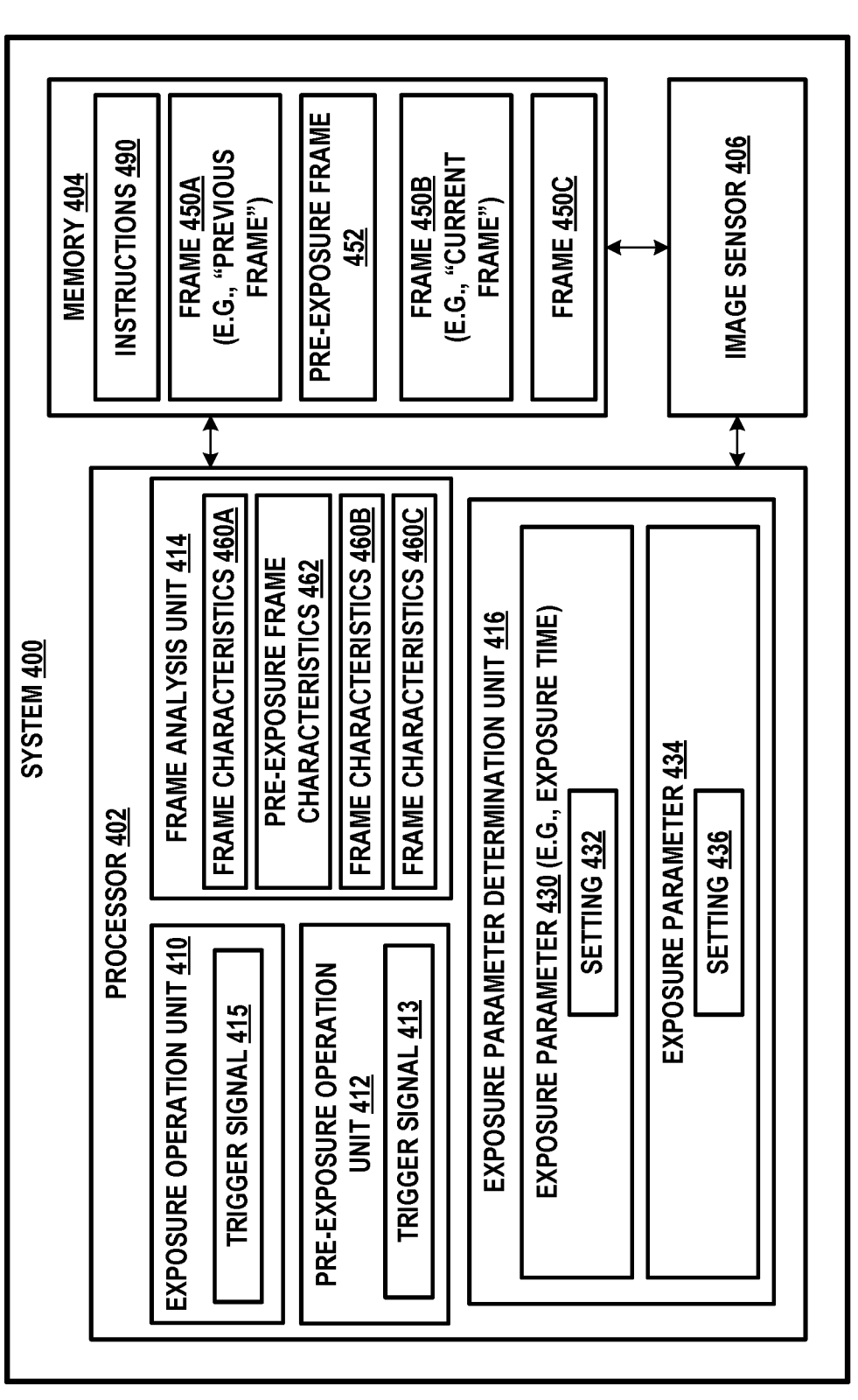
FIG. 4 is a system that is operable to reduce auto-exposure latency, according to example embodiments.

Referring to FIG. 4, a particular illustrative example of a system 400 that is operable to reduce auto-exposure latency is shown. The system 400 includes a processor 402, a memory 404, and an image sensor 406. According to one implementation, the processor 402, the memory 404, and the image sensor 406 can be integrated into a circuit, or integrated into a single chip, such that the processor 402 provides "on-chip" processing functionality with respect to the image sensor 406. The processor 402 can be coupled to the memory 404 to enable the exchange of data and commands between the processor 402 and the memory 404, the memory 404 can be coupled to the image sensor 406 to enable the exchange of data between the memory 404 and the image sensor 406, and the image sensor 406 can be coupled to the processor 402 to enable the exchange of data and commands between the image sensor 406 and the processor 402.

According to one implementation, the system 400 can be integrated into one or more sensor systems. As non-limiting examples, the system 400 can be integrated into one or more of the sensor systems 202, 204, 206, 208, 210, 212, 214, 218 of the vehicle 200. As another non-limiting example, the system 400 can be integrated into the sensor system 104 of the vehicle 100. In a particular implementation, the system 400 can be integrated into the camera 130. The above embodiments are not intended to be limiting and it should be understood that the system 400 can be integrated into other sensor systems and cameras.

The processor 402 includes an exposure operation unit 410, a pre-exposure operation unit 412, a frame analysis unit 414, and an exposure parameter determination unit 416. According to one implementation, one or more of the units 410, 412, 414, 416 can be implemented using dedicated hardware, such as one or more ASICs or one or more FPGAs. According to one implementation, one or more of the units 410, 412, 414, 416 can be implemented using instructions 490, stored in the memory 404, that are executed by the processor 402. For example, the processor 402 can execute the instructions 490 stored in the memory 404 (e.g., a non-transitory, computer-readable medium) to perform the operations described herein.

It should be noted that, in some implementations, operations or functions associated with one or more of the units 410, 412, 414, 416 can be integrated into a single unit. As a non-limiting example, the functionality of the exposure operation unit 410 and the pre-exposure operation unit 412 can be integrated into a single unit. It should also be noted that, in some implementations, one or more of the units 410, 412, 414, 416 can be absent from the processor 402. As a non-limiting example, in some implementations, such as the implementation described with respect to FIG. 5, the pre-exposure operation unit 412 can be absent from the processor 402 if pre-exposure frames are not generated.

The exposure operation unit 410 can be configured to initiate a frame exposure operation that enables the image sensor 406 to capture different frames 450. According to one implementation, the exposure operation unit 410 can transmit a trigger signal 415 to the image sensor 406 to enable the image sensor 406 to capture a frame 450. For example, during a frame period for capturing a frame 450A, the exposure operation unit 410 can transmit the trigger signal 415 to the image sensor 406 to enable the image sensor 406 to capture the frame 450A. Similarly, during frame periods for capturing other frames 450B, 450C, the exposure operation unit 410 can transmit the trigger signal 415 to the image sensor 406 to enable the image sensor 406 to capture the frames 450B, 450C, respectively. In some implementations, the trigger signal 415 can be generated and transmitted to the image sensor 406 from a host that is external to the system 400.

The frame analysis unit 414 can be configured to determine frame characteristics 460 (e.g., image properties) of the frames 450 captured by the image sensor 406. For example, the frame analysis unit 414 can determine frame characteristics 460A of the frame 450A in response to the image sensor 406 capturing the frame 450A, the frame analysis unit 414 can determine frame characteristics 460B of the frame 450B in response to the image sensor 406 capturing the frame 450B, and the frame analysis unit 414 can determine frame characteristics 460C of the frame 450C in response to the image sensor 406 capturing the frame 450C. According to one implementation, the frame characteristics 460 can indicate lighting properties associated with the frames 450. However, in other implementations, the frame characteristics 460 can indicate other properties, such as a noise level, contrast, etc.

In some implementations, the pre-exposure operation unit 412 can be configured to initiate a frame exposure operation that enables the image sensor 406 to capture a pre-exposure frame 452. For example, the pre-exposure operation unit 412 can generate and transmit a trigger signal 413 that enables the image sensor 406 to perform a pre-exposure operation to capture the pre-exposure frame 452. The pre-exposure frame 452 is a "partial" frame that can be captured at the beginning of a frame period and analyzed to determine one or more exposure parameters 430, 434 for a frame (e.g., a "full" frame) captured later in the frame period. The pre-exposure frame 452 can be generated in response to sampling a subset of image pixels on the image sensor 406. According to one implementation, the subset of image pixels are associated with a particular region of interest on the image sensor 406. As a non-limiting example, the particular region of interest on the image sensor 406 can correspond to a rectangular region proximate to a center section on the image sensor 406. As another non-limiting example, the particular region of interest on the image sensor 406 can correspond to one or more rows (e.g., pixel rows), one or more columns (e.g., pixel columns), or both. According to another implementation, the subset of image pixels are distributed across the image sensor 406.

In a similar manner as the frame analysis unit 414 determines frame characteristics 460 for the frames 450, the frame analysis unit 414 can be configured to determine pre-exposure frame characteristics 462 (e.g., image properties) of the pre-exposure frame 452 captured by the image sensor 406. According to one implementation, the pre-exposure frame characteristics 462 can indicate lighting properties associated with the pre-exposure frame 452. However, in other implementations, the pre-exposure frame characteristics 462 can indicate other properties, such as a noise level, contrast, etc.

The exposure parameter determination unit 416 can be configured to determine target settings 432, 436 for different exposure parameters 430, 434, respectively. The exposure parameters 430, 434 can correspond to an exposure time (e.g., a shutter speed) of the image sensor 406, an aperture size of the image sensor 406, an analog gain, a digital gain, etc. For ease of description, unless otherwise noted, the exposure parameter 430 corresponds to an exposure time. However, it should be understood that in other implementations, one or more of the exposure parameters 430, 434 could correspond to a different parameter (e.g., an aperture size, an analog gain, and/or a digital gain). It should also be noted that in other implementations, the exposure parameter determination unit 416 can be configured to determine target settings for more than two exposure parameters or can be configured to determine target settings for a single exposure parameter.

The exposure parameter determination unit 416 can determine the settings 432, 436 of the exposure parameters 430, 434, respectively, for frames to be captured by the image sensor 406 based at least in part on frame characteristics 460, 462. For example, according to one implementation, and as described in greater detail with respect to FIG. 5, the exposure parameter determination unit 416 can analyze the frame characteristics 460A of a previous frame (e.g., the frame 450A) and determine how to adjust the settings 432, 436 of the exposure parameters 430, 434, respectively, of subsequent frames 450B, 450C to be captured by the image sensor 406 based on the analysis. According to another implementation, and as described in greater detail with respect to FIG. 6, the exposure parameter determination unit 416 can analyze the pre-exposure frame characteristics 462 of the pre-exposure frame 452 and determine how to adjust the settings 432, 436 of the exposure parameters 430, 434, respectively, of the frame 450B to be captured based on the analysis. According to yet another implementation, and as described in greater detail with respect to FIG. 7, the exposure parameter determination unit 416 can analyze data from external sources (e.g., data collected from other sensors) to determine how to adjust the settings 432, 436 of the exposure parameters 430, 434, respectively, of the frames 450 to be captured based on the analysis.

As described above, the image sensor 406 can be configured to capture images of a surrounding environment. As a non-limiting example, the image sensor 406 can be configured to capture images (e.g., frames) of the surrounding environment of the vehicle 100, the vehicle 200, or both. Although generally described herein as an active pixel sensor (e.g., a complementary metal oxide semiconductor (CMOS) sensor), in some implementations, the image sensor 406 can be a charge-coupled device (CCD).

In some scenarios, characteristics of the surrounding environment change (e.g., when the vehicle 100 enters or exits a dark tunnel) and exposure parameters 430, 434 associated with the image sensor 406 need to be adjusted to capture high-quality images. For example, if the vehicle 100 enters into a tunnel and the surrounding environment becomes relatively dark, an exposure time used to capture an image at the image sensor 406 can be lengthened to increase lighting characteristics of the image (e.g., brighten the image). However, when the vehicle 100 exits the tunnel and the surrounding environment becomes relatively bright, the exposure time used to capture an image at the image sensor 406 can be shortened to decrease lighting characteristics of the image (e.g., darken the image). As described below, with respect to FIGS. 5-7, the on-chip processor 402 can be configured to reduce the latency associated with adjusting the exposure parameters 430, 434 of the image sensor 406 such that, within a single frame period, the exposure parameters 430, 434 can be adjusted and a corresponding frame with the adjusted exposure parameter can be generated.

Figure 5:
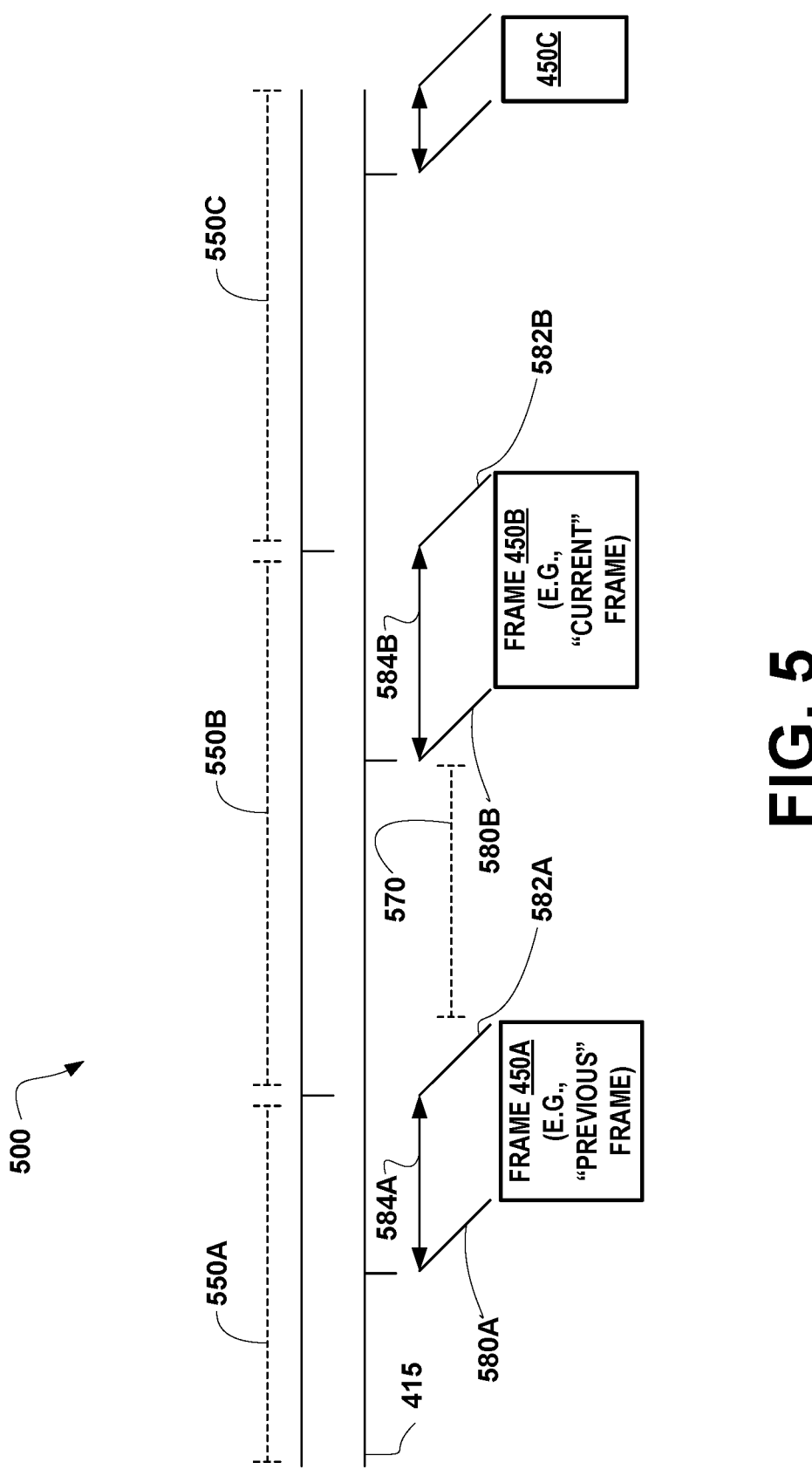
FIG. 5 is a process for reducing auto-exposure latency based on frame characteristics of a previously captured frame, according to example embodiments.

Referring to FIG. 5, a particular illustrative example of a process 500 for reducing auto-exposure latency is shown. The process 500 can be performed by various components of the system 400 of FIG. 4. In particular, one or more operations of the process 500 can be performed by the processor 402 of the system 400.

The process 500 depicts three frame periods 550 associated with capturing different frames 450. For example, the process 500 depicts a frame period 550A associated with capturing the frame 450A, a frame period 550B associated with capturing the frame 450B, and a frame period 550C associated with capturing the frame 450C. During each frame period 550, the trigger signal 415 is released and initiates the capture of a corresponding frame 450. For example, when the trigger signal 415 is released during the frame period 550A, a frame exposure operation for capturing the frame 450A is initiated. During the frame exposure operation for capturing the frame 450A, a shutter release 580A occurs to capture the frame 450A, and after an exposure time 584A elapses, the frame 450A is read 582A. Similarly, when the trigger signal 415 is released during the frame period 550B, a frame exposure operation for capturing the frame 450B is initiated. During the frame exposure operation for capturing the frame 450B, a shutter release 580B occurs to capture the frame 450B, and after an exposure time 584B elapses, the frame 450B is read 582B.

According to the process 500, the processor 402 can be configured to determine the setting 432 of the exposure parameter 430 (e.g., the exposure time 584B) for the frame 450B to be captured by the image sensor 406. For example, during an exposure parameter determination period 570, the processor 402 can determine the exposure time 584B for the frame 450B to be captured. The exposure parameter determination period 570 is a subset of the frame period 550B for capturing the frame 450B. Thus, the processor 402 can determine the setting 432 of the exposure parameter 430 (e.g., can set the exposure time 584B) for the frame 450B during the same frame period 550B that the frame 450B is generated.

The processor 402 can determine the setting 432 of the exposure parameter 430 for the frame 450B based at least in part on frame characteristics 460A of the frame 450A (e.g., the previous frame). As a non-limiting example, if the frame characteristics 460A of the previous frame 450A indicate that a lighting metric in the previous frame 450A failed to satisfy (e.g., failed to exceed) a lower lighting threshold (e.g., the previous frame 450A was too dark), during the frame period 550B for the current frame 450B (e.g., during the exposure parameter determination period 570), the processor 402 can determine that the exposure time 584B for the current frame 450B should be extended (compared to the exposure time 584A of the previous frame 450A) and implement the extended exposure time 584B at the image sensor 406. Conversely, if the frame characteristics 460A of the previous frame 450A indicate that a lighting metric in the previous frame 450A failed to satisfy (e.g., failed to be less than) an upper lighting threshold (e.g., the previous frame 450A was too bright), during the frame period 550B for the current frame 450B (e.g., during the exposure parameter determination period 570), the processor 402 can determine that the exposure time 584B for the current frame 450B should be reduced (compared to the exposure time 584A of the previous frame 450A) and implement the reduced exposure time 584B at the image sensor 406.

Although the above example describes adjusting the exposure time 584A based on the frame characteristics 460A of the frame 450A (e.g., the previous frame), it should be understood that the processor 402 can adjust the settings for other exposure parameters during the exposure parameter determination period 570 and apply the adjusted settings to the frame 450B. As non-limiting examples, based on the frame characteristics 460A of the frame 450A, the processor 402 can adjust analog gain settings, digital gain settings, etc. Additionally, as described in greater detail with respect to FIG. 7, the exposure parameters can be further adjusted based on external inputs (e.g., data from other sensors).

Thus, the techniques described with respect to FIGS. 4 and 5 enable the processor 402 to reduce the latency associated with adjusting the exposure time 584B. For example, instead of having a delay (e.g., a single frame delay or a multiple frame delay) between when the target exposure time 584B (or other target exposure parameters) is determined and when the frame 450B with the target exposure time 584B is read from the image sensor 406, the techniques described with respect to FIGS. 4 and 5 can reduce (or eliminate) the delay such that the frame 450B with the target exposure time 584B is read during the same frame period 550B that the target exposure time 584B is determined. By reducing the latency as described above, the techniques described with respect to FIGS. 4 and 5 can reduce the number of over-exposed frames that are captured and can reduce the number of under-exposed frames that are captured.

Figure 6:
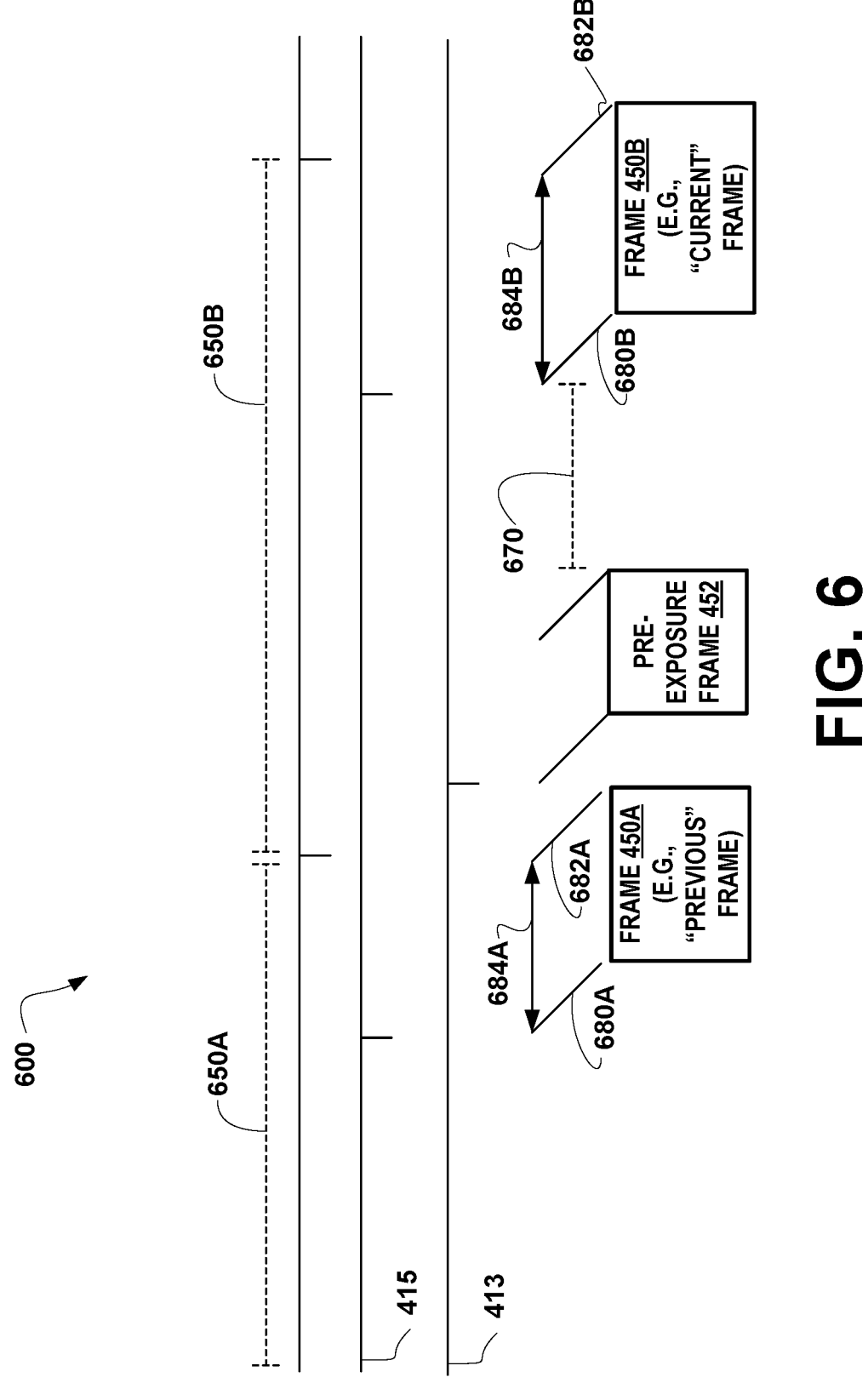
FIG. 6 is a process for reducing auto-exposure latency based on frame characteristics of a pre-exposure frame, according to example embodiments.

Referring to FIG. 6, another particular illustrative example of a process 600 for reducing auto-exposure latency is shown. The process 600 can be performed by various components of the system 400 of FIG. 4. In particular, one or more operations of the process 600 can be performed by the processor 402 of the system 400.

The process 600 depicts two frame periods 650 associated with capturing different frames 450. For example, the process 600 depicts a frame period 650A associated with capturing the frame 450A and a frame period 650B associated with capturing the frame 450B. During each frame period 650, the trigger signal 415 is released and initiates the capture of a corresponding frame 450. For example, when the trigger signal 415 is released during the frame period 650A, a frame exposure operation for capturing the frame 450A is initiated. During the frame exposure operation for capturing the frame 450A, a shutter release 680A occurs to capture the frame 450A, and after an exposure time 684A elapses, the frame 450A is read from read step 682A. Similarly, when the trigger signal 415 is released during the frame period 650B, a frame exposure operation for capturing the frame 450B is initiated. During the frame exposure operation for capturing the frame 450B, a shutter release 680B occurs to capture the frame 450B, and after an exposure time 684B elapses, the frame 450B is read 682B.

Prior to capturing the frame 450B, the pre-exposure frame 452 is captured during the frame period 650B. For example, at the beginning of the frame period 650B, the trigger signal 413 is released to enable capture of the pre-exposure frame 452. The pre-exposure frame 452 can be generated in response to sampling a subset of the image pixels on the image sensor 406. The subset of image pixels can be associated with a particular region of interest (e.g., a region proximate to a center section of the image sensor, particular rows, and/or particular columns) or can be distributed across the image sensor 406.

In response to capturing the pre-exposure frame 452 at the beginning of the frame period 650B, during an exposure parameter determination period 670 that falls within (e.g., is a subset of) the frame period 650B, the processor 402 can determine the exposure time 684B for the frame 450B to be captured. Thus, the processor 402 can determine the setting 432 of the exposure parameter 430 (e.g., can set the exposure time 684B) for the frame 450B during the same frame period 650B that the frame 450B is generated.

According to the process 600, the processor 402 can be configured to determine the exposure time 684B for the frame 450B to be captured based at least in part on the pre-exposure frame characteristics 462 of the pre-exposure frame 452. As a non-limiting example, if the pre-exposure frame characteristics 462 of the pre-exposure frame 452 indicate that a lighting metric in the pre-exposure frame 452 failed to satisfy a lower lighting threshold (e.g., the pre-exposure frame 452 was too dark), during the exposure parameter determination period 670, the processor 402 can determine that the exposure time 684B for the current frame 450B should be extended and implement the extended exposure time 684B at the image sensor 406. Conversely, if the pre-exposure frame characteristics 462 of the pre-exposure frame 452 indicate that a lighting metric in the pre-exposure frame 452 failed to satisfy an upper lighting threshold (e.g., the pre-exposure frame 452 was too bright), during the exposure parameter determination period 670, the processor 402 can determine that the exposure time 684B for the current frame 450B should be reduced and implement the reduced exposure time 684B at the image sensor 406.

Although the above example describes adjusting the exposure time 684A based on the pre-exposure frame characteristics 462 of the pre-exposure frame 452, it should be understood that the processor 402 can adjust the settings for other exposure parameters during the exposure parameter determination period 670 and apply the adjusted settings to the frame 450B. As non-limiting examples, based on the pre-exposure frame characteristics 462 of the pre-exposure frame 452, the processor 402 can adjust analog gain settings, digital gain settings, etc. Additionally, as described in greater detail with respect to FIG. 7, the exposure parameters can be further adjusted based on external inputs (e.g., data from other sensors).

Thus, the techniques described with respect to FIGS. 4 and 6 enable the processor 402 to reduce the latency associated with adjusting the exposure time 684B. For example, instead of having a delay (e.g., a single frame delay or a multiple frame delay) between when the target exposure time 684B (or other target exposure parameters) is determined and when the frame 450B with the target exposure time 684B is read from the image sensor 406, the techniques described with respect to FIGS. 4 and 6 can reduce (or eliminate) the delay such that the frame 450B with the target exposure time 684B is read during the same frame period 650B that the target exposure time 684B is determined. By reducing the latency described above, the techniques described with respect to FIGS. 4 and 6 can reduce the number of over-exposed frames that are captured and can reduce the number of under-exposed frames that are captured.

Figure 7:
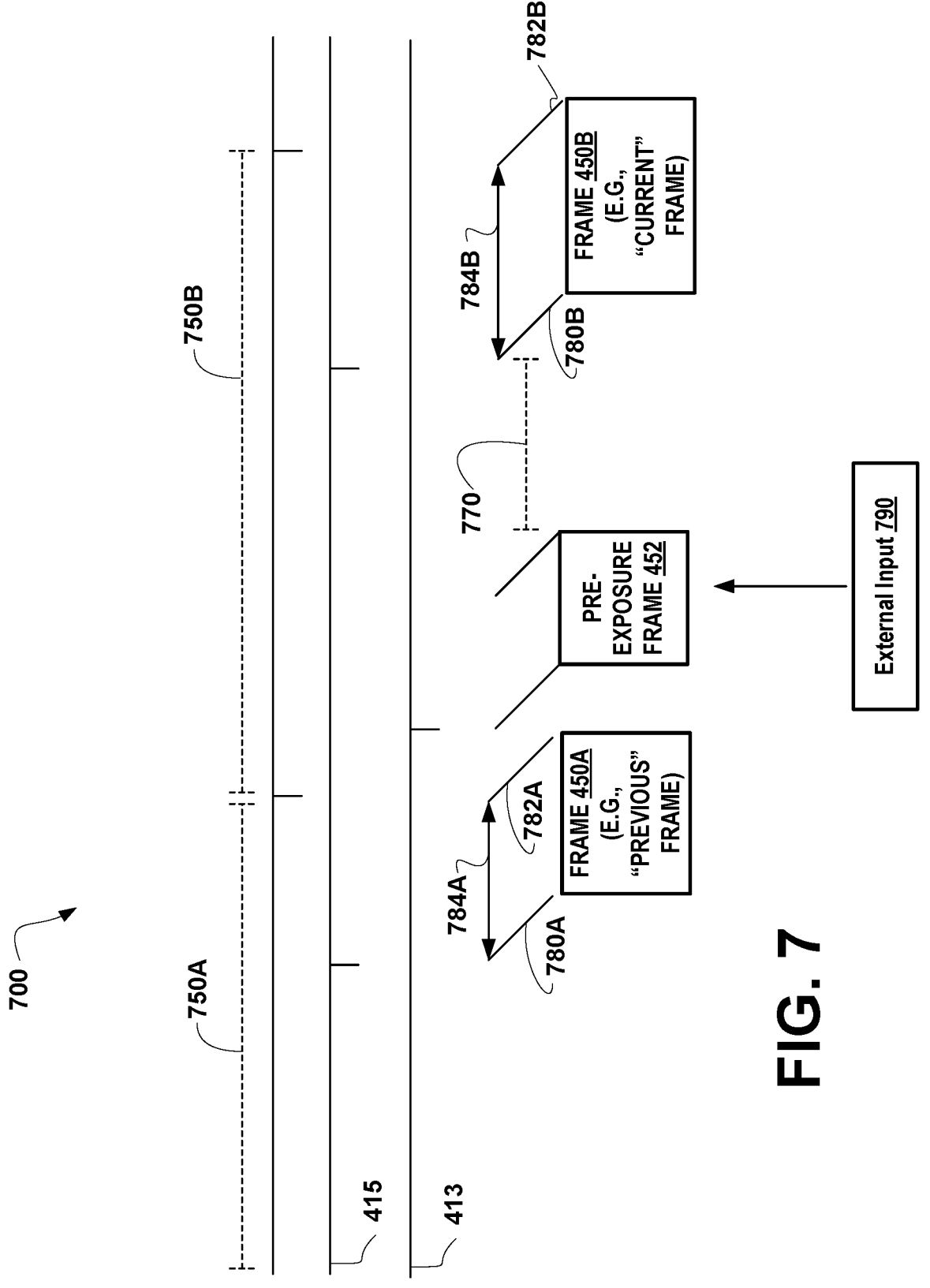
FIG. 7 is another process for reducing auto-exposure latency, according to example embodiments.

Referring to FIG. 7, another particular illustrative example of a process 700 for reducing auto-exposure latency is shown. The process 700 can be performed by various components of the system 400 of FIG. 4. In particular, one or more operations of the process 700 can be performed by the processor 402 of the system 400.

The process 700 depicts two frame periods 750A and 750B associated with capturing different frames 450. For example, the process 700 depicts a frame period 750A associated with capturing the frame 450A and a frame period 750B associated with capturing the frame 450B. During each frame period, the trigger signal 415 is released and initiates the capture of a corresponding frame 450. For example, when the trigger signal 415 is released during the frame period 750A, a frame exposure operation for capturing the frame 450A is initiated. During the frame exposure operation for capturing the frame 450A, a shutter release 780A occurs to capture the frame 450A, and after an exposure time 784A elapses, the frame 450A is read at read step 782A. Similarly, when the trigger signal 415 is released during the frame period 750B, a frame exposure operation for capturing the frame 450B is initiated. During the frame exposure operation for capturing the frame 450B, a shutter release 780B occurs to capture the frame 450B, and after an exposure time 784B elapses, the frame 450B is read at read step 782B.

Prior to capturing the frame 450B, the pre-exposure frame 452 is captured during the frame period 750B. For example, in a similar manner as described with respect to FIG. 6, at the beginning of the frame period 750B, the trigger signal 413 is released to enable capture of the pre-exposure frame 452. Additionally, an external input 790 can also be received by the processor 402 during the frame period 750B. The external input 790 can include data captured from one or more other sensors (e.g., other cameras, one or more lidars, one or more radars, and/or one or more accelerometers). As non-limiting examples, the external input 790 can include data indicative of environmental conditions based on image frames captured by one or more other sensors. According to some implementations, the image frames that are the basis of the external input 790 can be captured just prior to the image frame 450B to be captured during the frame period 750B.

During an exposure parameter determination period 770 that falls within (e.g., is a subset of) the frame period 750B, the processor 402 can determine the settings 432, 436 of the exposure parameters 430, 434 for the frame 450B to be captured based on the external input 790, the frame characteristics 460A of the previous frame 450A, the pre-exposure frame characteristics 462 of the pre-exposure frame 452, or a combination thereof. For example, based on at least one of the external input 790, the frame characteristics 460A of the previous frame 450A, or the pre-exposure frame characteristics 462 of the pre-exposure frame 452, the processor 402 can determine the exposure time 784B for the frame 450B, the analog gain for the frame 450B, the digital gain for the frame 450B, etc., and adjust the exposure parameters 430, 434 for the frame 450B, accordingly.

Thus, the techniques described with respect to FIGS. 4 and 7 enable the processor 402 to reduce the latency associated with adjusting the exposure time 784B. For example, instead of having a delay (e.g., a single frame delay or a multiple frame delay) between when the target exposure time 784B is determined and when the frame 450B with the target exposure time 784B is read from the image sensor 406, the techniques described with respect to FIGS. 4 and 7 can reduce (or eliminate) the delay such that the frame 450B with the target exposure time 684B is read during the same frame period 750B that the target exposure time 784B is determined. By reducing the latency described above, the techniques described with respect to FIGS. 4 and 7 can reduce the number of over-exposed frames that are captured and can reduce the number of under-exposed frames that are captured.

Referring to FIG. 8, a particular illustrative example of a method 800 for reducing auto-exposure latency is shown. The method 800 can be performed by various components of the system 400 of FIG. 4. In particular, one or more operations associated with the method 800 can be performed by the processor 402 of the system 400.

The method 800 includes determining, by a processor, a first setting of an exposure parameter for a first frame to be captured by an image sensor, at block 802. The first setting of the exposure parameter is determined based at least in part on characteristics of a previous frame captured by the image sensor, and the first setting of the exposure parameter is determined during a first frame period associated with capturing the first frame. For example, referring to FIGS. 4 and 5, the processor 402 can determine the setting 432 of the exposure parameter 430 for the frame 450B to be captured by the image sensor 406. The setting 432 of the exposure parameter 430 can be determined based at least in part on the frame characteristics 460A of the frame 450A captured by the image sensor 406, and the setting 432 can be determined during the frame period 550B associated with capturing the frame 450B. According to one implementation of the method 800, the preceding frame 450A is captured during a frame period 550A that is preceding and adjacent to the first frame period 550B.

The method 800 also includes initiating, by the processor, a first frame exposure operation during the first frame period, at block 804. The first frame exposure operation is based on the first setting of the exposure parameter. For example, referring to FIGS. 4 and 5, the processor 402 can initiate the frame exposure operation during the frame period 550B. The frame exposure operation can be based on the setting 432 of the exposure parameter 430.

According to one implementation of the method 800, the exposure parameter corresponds to the exposure time 584B. According to other implementations of the method 800, the exposure parameter corresponds to an analog gain or a digital gain.

According to one implementation, the method 800 also includes determining the first setting of the exposure parameter based on an external input. For example, referring to FIGS. 4 and 7, the processor 402 can determine the setting 432 of the exposure parameter 430 for the frame 450B based on the external input 790, in addition to the frame characteristics 460A of the frame 450A. The external input 790 can be based on external sensor data from one or more other sensors. For example, according to some implementations, the external sensor data corresponds to image sensor data or environmental sensor data.

According to one implementation of the method 800, the first frame exposure operation is initiated in response to receiving a trigger signal, such as the trigger signal 415. The method 800 can also include scheduling transmission of the trigger signal 415 during the first frame period 550B and transmitting the trigger signal 415 to the image sensor 406 during the first frame period 550B according to the scheduled transmission of the trigger signal 415.

According to one implementation, the method 800 also includes determining a second setting of the exposure parameter for a second frame to be captured by the image sensor. For example, referring to FIGS. 4 and 5, the processor 402 can determine another setting of the exposure parameter 430 for the frame 450C to be captured by the image sensor 406. The second setting of the exposure parameter 430 can be determined based at least in part on the characteristics 460B of the first frame 450B. The second setting can be determined during a second frame period 550C associated with capturing the second frame 450C, and the second frame period 550C can be subsequent and adjacent to the first frame period 550B. The method 800 can also include performing a second frame exposure operation during the second frame period 550C. The second frame exposure operation is based on the second setting of the exposure parameter 430. According to one implementation of the method 800, the second setting of the exposure parameter 430 is further determined based on characteristics 460A of the previous frame 450A.

The method 800 of FIG. 8 enables the processor 402 to reduce the latency associated with adjusting the exposure time 584B. For example, instead of having a delay between when the target exposure time 584B (or other target exposure parameters) is determined and when the frame 450B with the target exposure time 584B is read from the image sensor 406, the method 800 can reduce (or eliminate) the delay such that the frame 450B with the target exposure time 584B is read during the same frame period 550B that the target exposure time 584B is determined. By reducing the latency as described above, the method 800 can reduce the number of over-exposed frames that are captured and can reduce the number of under-exposed frames that are captured, which in turn can improve storage capacity.

Referring to FIG. 9, a particular illustrative example of a method 900 for reducing auto-exposure latency is shown. The method 900 can be performed by various components of the system 400 of FIG. 4. In particular, one or more operations associated with the method 900 can be performed by the processor 402 of the system 400.

The method 900 includes receiving, by a processor, a first pre-exposure frame from an image sensor during a first frame period associated with capturing a first frame, at block 902. For example, referring to FIGS. 4 and 6, the processor 402 can receive the pre-exposure frame 452 from the image sensor 406 during the frame period 650B associated with capturing the frame 450B.

The method 900 also includes determining, by the processor, a first setting of an exposure parameter for the first frame to be captured by the image sensor, at block 904. The first setting of the exposure parameter is determined based at least in part on characteristics of the first pre-exposure frame, and the first setting of the exposure parameter is determined during the first frame period. For example, referring to FIGS. 4 and 6, the processor can determine the setting 432 of the exposure parameter 430 for the frame 450B to be captured by the image sensor 406. The setting 432 of the exposure parameter 430 is determined based at least in part on the pre-exposure frame characteristics 462 of the pre-exposure frame 452, and the setting 432 of the exposure parameter 430 is determined during the frame period 650B.

The method 900 also includes initiating, by the processor, a first frame exposure operation based on the first setting of the exposure parameter, at block 906. During the first frame exposure operation, the image sensor captures the first frame during the first frame period. For example, the processor 402 can initiate the frame exposure operation based on the setting 432 of the exposure parameter 430. During the frame exposure operation, the image sensor 406 captures the frame 450B during the frame period 650B.

According to one implementation of the method 900, the first pre-exposure frame 452 is captured by the image sensor 406 during the first frame period 650B. The first pre-exposure frame 452 can be generated in response to sampling a subset of image pixels on the image sensor 406. The subset of image pixels can be associated with a particular region of interest on the image sensor 406 or can be distributed across the image sensor 406. The particular region of interest can correspond to a rectangular region proximate to a center section of the image sensor 406, one or more rows of pixels, one or more columns of pixels, etc.

According to one implementation, the method 900 also includes determining the first setting of the exposure parameter based on an external input. For example, referring to FIGS. 4 and 7, the processor 402 can determine the setting 432 of the exposure parameter 430 for the frame 450B based on the external input 790, in addition to the pre-exposure frame characteristics 462 of the pre-exposure frame 452. The external input 790 can be based on external sensor data from one or more other sensors. For example, according to some implementations, the external sensor data corresponds to image sensor data or environmental sensor data.

The method 900 of FIG. 9 enables the processor 402 to reduce the latency associated with adjusting the exposure time 684B. For example, instead of having a delay between when the target exposure time 684B (or other target exposure parameters) is determined and when the frame 450B with the target exposure time 684B is read from the image sensor 406, the method 900 can reduce (or eliminate) the delay such that the frame 450B with the target exposure time 684B is read during the same frame period 650B that the target exposure time 684B is determined. By reducing the latency described above, the method 900 can reduce the number of over-exposed frames that are captured and can reduce the number of under-exposed frames that are captured, which in turn can improve storage capacity.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system comprising:
an image sensor;
a processor coupled to the image sensor, wherein the processor is configured to:
receive a first pre-exposure frame from the image sensor during a first frame period associated with capturing a first frame; and
determine a first setting of an exposure parameter for the first frame to be captured by the image sensor, wherein the first setting of the exposure parameter is determined based at least in part on characteristics of the first pre-exposure frame, wherein the first setting of the exposure parameter is determined during the first frame period, wherein the first frame period begins directly after a capture of a previous frame and ends directly after a capture of the first frame, and wherein a length of time of the first frame period corresponds to an inverse of a frame rate associated with the image sensor,
wherein the image sensor is configured to perform a first frame exposure operation based on the first setting of the exposure parameter, and
wherein, during the first frame exposure operation, the image sensor captures the first frame during the first frame period.

2. The system of claim 1, wherein the first pre-exposure frame is captured by the image sensor during the first frame period.

3. The system of claim 1, wherein the first pre-exposure frame is generated in response to sampling a subset of image pixels on the image sensor.

4. The system of claim 3, wherein the subset of image pixels are associated with a region of interest on the image sensor.

5. The system of claim 4, wherein the region of interest corresponds to a rectangular region proximate to a center section of the image sensor.

6. The system of claim 4, wherein the region of interest corresponds to one or more rows, one or more columns, or both.

7. The system of claim 3, wherein the subset of image pixels are distributed across the image sensor.

8. The system of claim 1, wherein the exposure parameter corresponds to an aperture size, an exposure time, an analog gain, or a digital gain.

9. The system of claim 1, wherein the processor is further configured to determine the first setting of the exposure parameter based on an external input.

10. A method comprising:
receiving, by a processor, a first pre-exposure frame from an image sensor during a first frame period associated with capturing a first frame;
determining, by the processor, a first setting of an exposure parameter for the first frame to be captured by the image sensor, wherein the first setting of the exposure parameter is determined based at least in part on characteristics of the first pre-exposure frame, and wherein the first setting of the exposure parameter is determined during the first frame period, wherein the first frame period begins directly after a capture of a previous frame and ends directly after a capture of the first frame, and wherein a length of time of the first frame period corresponds to an inverse of a frame rate associated with the image sensor; and
initiating, by the processor, a first frame exposure operation based on the first setting of the exposure parameter, wherein, during the first frame exposure operation, the image sensor captures the first frame during the first frame period.

11. The method of claim 10, wherein the first pre-exposure frame is captured by the image sensor during the first frame period.

12. The method of claim 10, wherein the first pre-exposure frame is generated in response to sampling a subset of image pixels on the image sensor.

13. The method of claim 12, wherein the subset of image pixels are associated with a region of interest on the image sensor.

14. The method of claim 13, wherein the region of interest corresponds to a rectangular region proximate to a center section of the image sensor.

15. The method of claim 13, wherein the region of interest corresponds to one or more rows, one or more columns, or both.

16. The method of claim 12, wherein the subset of image pixels are distributed across the image sensor.

17. The method of claim 10, wherein the exposure parameter corresponds to an aperture size, an exposure time, an analog gain, or a digital gain.

18. A non-transitory computer-readable medium comprising instructions that, when executed by processor, cause the processor to perform operations comprising:

receiving a first pre-exposure frame from an image sensor during a first frame period associated with capturing a first frame;

determining a first setting of an exposure parameter for the first frame to be captured by the image sensor, wherein the first setting of the exposure parameter is determined based at least in part on characteristics of the first pre-exposure frame, wherein the first setting of the exposure parameter is determined during the first frame period, and wherein the first frame period begins directly after a capture of a previous frame and ends directly after a capture of the first frame, and wherein a length of time of the first frame period corresponds to an inverse of a frame rate associated with the image sensor; and initiating a first frame exposure operation based on the first setting of the exposure parameter, wherein, during the first frame exposure operation, the image sensor captures the first frame during the first frame period.

19. The non-transitory computer-readable medium of claim 18, wherein the first pre-exposure frame is captured by the image sensor during the first frame period.

20. The non-transitory computer-readable medium of claim 18, wherein the first pre-exposure frame is generated in response to sampling a subset of image pixels on the image sensor.

21. The non-transitory computer-readable medium of claim 20, wherein the subset of image pixels are associated with a region of interest on the image sensor.

\* \* \* \* \*